(12) United States Patent
    Otsuka

(10) Patent No.: US 12,387,381 B2
(45) Date of Patent: Aug. 12, 2025

(54) IMAGE DATA TRANSFER APPARATUS, IMAGE DISPLAY SYSTEM, AND IMAGE DATA TRANSFER METHOD

(71) Applicant: SONY INTERACTIVE ENTERTAINMENT INC., Tokyo (JP)

(72) Inventor: Katsushi Otsuka, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 423 days.

(21) Appl. No.: 17/911,256

(22) PCT Filed: Mar. 30, 2020

(86) PCT No.: PCT/JP2020/014681
§ 371 (c)(1),
(2) Date: Sep. 13, 2022

(87) PCT Pub. No.: WO2021/199205
PCT Pub. Date: Oct. 7, 2021

(65) Prior Publication Data
US 2023/0099405 A1    Mar. 30, 2023

(51) Int. Cl.
G06V 10/00    (2022.01)
G02B 27/01    (2006.01)
(Continued)

(52) U.S. Cl.
CPC ............ *G06T 9/00* (2013.01); *G02B 27/0172* (2013.01); *G06F 3/013* (2013.01); *G06T 3/40* (2013.01);
(Continued)

(58) Field of Classification Search
CPC ..... G06T 9/00; G06T 3/40; G06T 7/11; G06T 2207/30168; G02B 27/0172;
(Continued)

(56) References Cited

U.S. PATENT DOCUMENTS

2020/0395117 A1*  12/2020  Schnorr ................ G06N 3/088
2021/0000449 A1*   1/2021  Deo .................... A61B 5/7267
(Continued)

FOREIGN PATENT DOCUMENTS

JP    2002-247602 A    8/2002
JP    2002-300581 A   10/2002
(Continued)

OTHER PUBLICATIONS

International Search Report and Written Opinion mailed Jun. 16, 2020, from PCT/JP2020/014681, 12 sheets.
(Continued)

*Primary Examiner* — Frank F Huang
(74) *Attorney, Agent, or Firm* — Kilpatrick Townsend & Stockton LLP

(57) ABSTRACT

At a server 400, a rate control map storage section 430 of a compressing/encoding section 422 stores a rate control map on which an image quality deterioration tolerance is set for each compression unit. A status acquiring section 432 acquires a distribution of image resolutions and positional coordinates of a point of gaze of a user, and a map generating section 434 generates or corrects the rate control map on the basis of the acquired information. On the basis of the rate control map, a compression/encoding processing section 436 sets a target value of a data size, and compresses and encodes image data while performing feedback control. A communication section 426 transmits the data obtained after the compression, in units of partial images formed by splitting a frame.

22 Claims, 18 Drawing Sheets

(51) Int. Cl.
*G06F 3/01* (2006.01)
*G06T 3/40* (2006.01)
*G06T 7/11* (2017.01)
*G06T 9/00* (2006.01)
*G06V 10/25* (2022.01)

(52) U.S. Cl.
CPC ............... *G06T 7/11* (2017.01); *G06V 10/25* (2022.01); *G06T 2207/30168* (2013.01)

(58) Field of Classification Search
CPC ...... G02B 2027/0138; G02B 2027/014; G02B 2027/0187; G06F 3/013; G06V 10/25; G06V 10/50; G06V 10/993; G06V 20/20; G06V 40/18; H04N 19/115; H04N 19/167
See application file for complete search history.

(56) References Cited

U.S. PATENT DOCUMENTS

| | | | |
|---|---|---|---|
| 2021/0158512 A1* | 5/2021 | Sun | G06T 13/80 |
| 2021/0240825 A1* | 8/2021 | Kutt | G06F 21/563 |
| 2021/0240826 A1* | 8/2021 | Kutt | G06N 20/00 |
| 2022/0036523 A1* | 2/2022 | Moran | G06T 5/70 |
| 2022/0051781 A1* | 2/2022 | Laaksonen | G06N 3/08 |
| 2023/0188384 A1* | 6/2023 | Claffey | H04L 25/022 |
| | | | 375/262 |
| 2023/0196803 A1* | 6/2023 | Roessler | G06V 10/771 |
| | | | 382/181 |
| 2023/0206700 A1* | 6/2023 | Khan | G06V 40/165 |
| | | | 382/116 |
| 2023/0273291 A1* | 8/2023 | Ozturk | G01S 7/006 |
| | | | 342/52 |
| 2023/0281751 A1* | 9/2023 | Yan | G06N 3/0464 |
| | | | 382/100 |

FOREIGN PATENT DOCUMENTS

| | | |
|---|---|---|
| JP | 2009033423 A | 2/2009 |
| WO | 2018/125579 A1 | 7/2018 |

OTHER PUBLICATIONS

Geisler, W. S., Perry, J.S., A real-time foveated multiresolution system for low-bandwidth video communication, SPIE Conference on Human Vision and Electronic Imaging, Jan. 1998, SPIE, vol. 3299, pp. 294-305, 2. System overview, 7. Thresholding and quantization.

Ryoo, J. et al., Design and evaluation of a foveated video streaming service for commodity client devices, MMSys' 16, May 2016, pp. 1-11, 1. Introduction, 2. Background and related work.

Romero-Rondon, M.F. et al., Foveated streaming of virtual reality videos, MMSys' 18, Jun. 2018, pp. 494-497, 1 Introduction.

Notice of Reasons for Refusal drafted Jun. 19, 2023, from Japanese Patent Application No. 2022-512938, 5 sheets.

* cited by examiner

FIG. 5

| | | | | | | | | | | | | | | | |
|---|---|---|---|---|---|---|---|---|---|---|---|---|---|---|---|
| 10 | 10 | 10 | 10 | 10 | 10 | 10 | 10 | 10 | 10 | 10 | 10 | 10 | 10 | 10 | 10 |
| 10 | 10 | 10 | 9 | 9 | 9 | 9 | 9 | 9 | 9 | 9 | 9 | 10 | 10 | 10 | |
| 10 | 10 | 10 | 8 | 7 | 6 | 5 | 5 | 5 | 5 | 6 | 7 | 8 | 10 | 10 | 10 |
| 10 | 9 | 8 | 7 | 6 | 3 | 3 | 3 | 3 | 3 | 3 | 6 | 7 | 8 | 9 | 10 |
| 10 | 9 | 7 | 6 | 2 | 1 | 1 | 1 | 1 | 1 | 1 | 2 | 6 | 7 | 9 | 10 |
| 10 | 9 | 6 | 3 | 1 | 1 | 1 | 1 | 1 | 1 | 1 | 1 | 3 | 6 | 9 | 10 |
| 10 | 9 | 5 | 3 | 1 | 1 | 0 | 0 | 0 | 0 | 1 | 1 | 3 | 5 | 9 | 10 |
| 10 | 9 | 5 | 3 | 1 | 1 | 0 | 0 | 0 | 0 | 1 | 1 | 3 | 5 | 9 | 10 |
| 10 | 9 | 5 | 3 | 1 | 1 | 0 | 0 | 0 | 0 | 1 | 1 | 3 | 5 | 9 | 10 |
| 10 | 9 | 5 | 3 | 1 | 1 | 0 | 0 | 0 | 0 | 1 | 1 | 3 | 5 | 9 | 10 |
| 10 | 9 | 6 | 3 | 1 | 1 | 1 | 1 | 1 | 1 | 1 | 1 | 3 | 6 | 9 | 10 |
| 10 | 9 | 7 | 6 | 2 | 1 | 1 | 1 | 1 | 1 | 1 | 2 | 6 | 7 | 9 | 10 |
| 10 | 9 | 8 | 7 | 6 | 3 | 3 | 3 | 3 | 3 | 3 | 6 | 7 | 8 | 9 | 10 |
| 10 | 10 | 10 | 8 | 7 | 6 | 5 | 5 | 5 | 5 | 6 | 7 | 8 | 10 | 10 | 10 |
| 10 | 10 | 10 | 9 | 9 | 9 | 9 | 9 | 9 | 9 | 9 | 9 | 10 | 10 | 10 | 10 |
| 10 | 10 | 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 | 10 | 10 |
| 10 | 10 | 10 | 9 | 9 | 9 | 9 | 9 | 9 | 9 | 9 | 9 | 10 | 10 | 10 | 10 |
| 10 | 10 | 10 | 8 | 7 | 6 | 5 | 5 | 5 | 5 | 6 | 7 | 8 | 10 | 10 | 10 |
| 10 | 9 | 8 | 7 | 6 | 3 | 3 | 3 | 3 | 3 | 3 | 6 | 7 | 8 | 9 | 10 |
| 10 | 9 | 7 | 6 | 2 | 1 | 1 | 1 | 1 | 1 | 1 | 2 | 6 | 7 | 9 | 10 |
| 10 | 9 | 6 | 3 | 1 | 1 | 1 | 1 | 1 | 1 | 1 | 1 | 3 | 6 | 9 | 10 |
| 10 | 9 | 5 | 3 | 1 | 1 | 0 | 0 | 0 | 0 | 1 | 1 | 3 | 5 | 9 | 10 |
| 10 | 9 | 5 | 3 | 1 | 1 | 0 | 0 | 0 | 0 | 1 | 1 | 3 | 5 | 9 | 10 |
| 10 | 9 | 5 | 3 | 1 | 1 | 0 | 0 | 0 | 0 | 1 | 1 | 3 | 5 | 9 | 10 |
| 10 | 9 | 5 | 3 | 1 | 1 | 0 | 0 | 0 | 0 | 1 | 1 | 3 | 5 | 9 | 10 |
| 10 | 9 | 6 | 3 | 1 | 1 | 1 | 1 | 1 | 1 | 1 | 1 | 3 | 6 | 9 | 10 |
| 10 | 9 | 7 | 6 | 2 | 1 | 1 | 1 | 1 | 1 | 1 | 2 | 6 | 7 | 9 | 10 |
| 10 | 9 | 8 | 7 | 6 | 3 | 3 | 3 | 3 | 3 | 3 | 6 | 7 | 8 | 9 | 10 |
| 10 | 10 | 10 | 8 | 7 | 6 | 5 | 5 | 5 | 5 | 6 | 7 | 8 | 10 | 10 | 10 |
| 10 | 10 | 10 | 9 | 9 | 9 | 9 | 9 | 9 | 9 | 9 | 9 | 10 | 10 | 10 | 10 |
| 10 | 10 | 10 | 10 | 10 | 10 | 10 | 10 | 10 | 10 | 10 | 10 | 10 | 10 | 10 | 10 |

Top half: 8b
Bottom half: 8a
Right: 6

FIG. 8
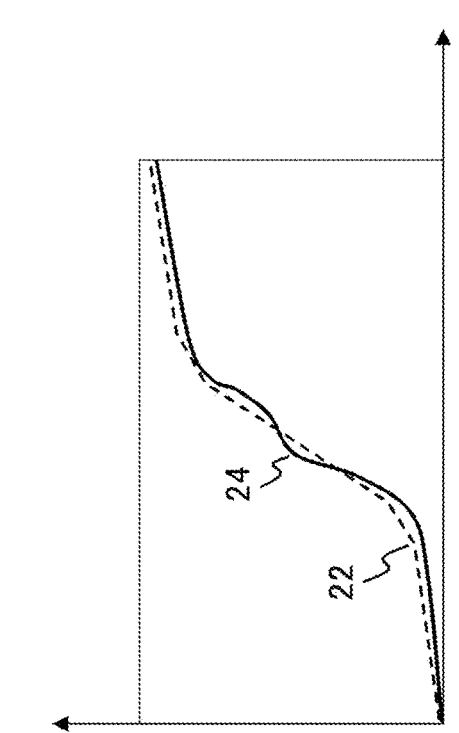
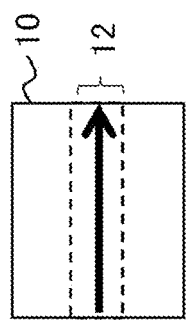
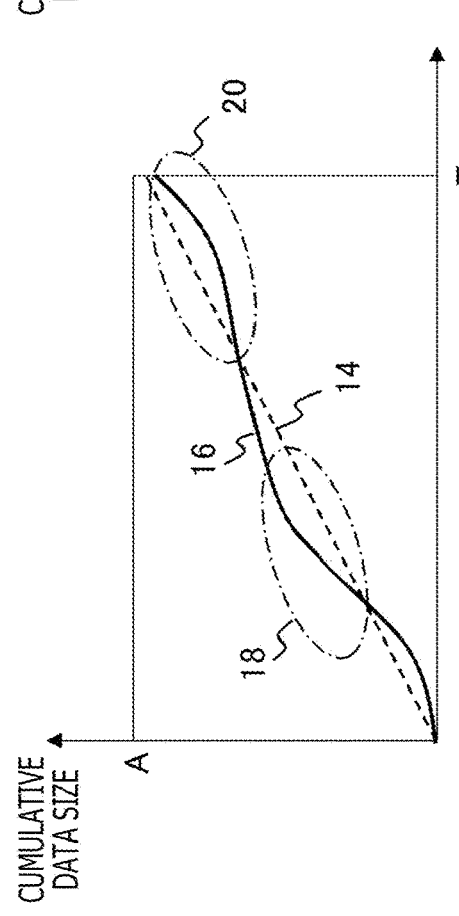

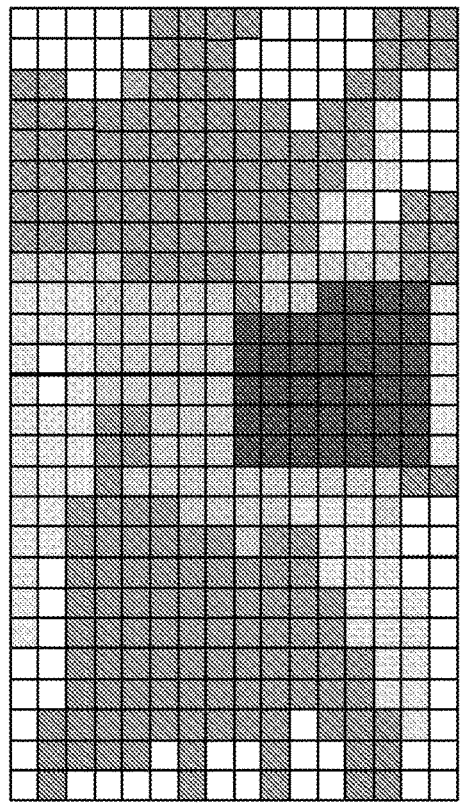
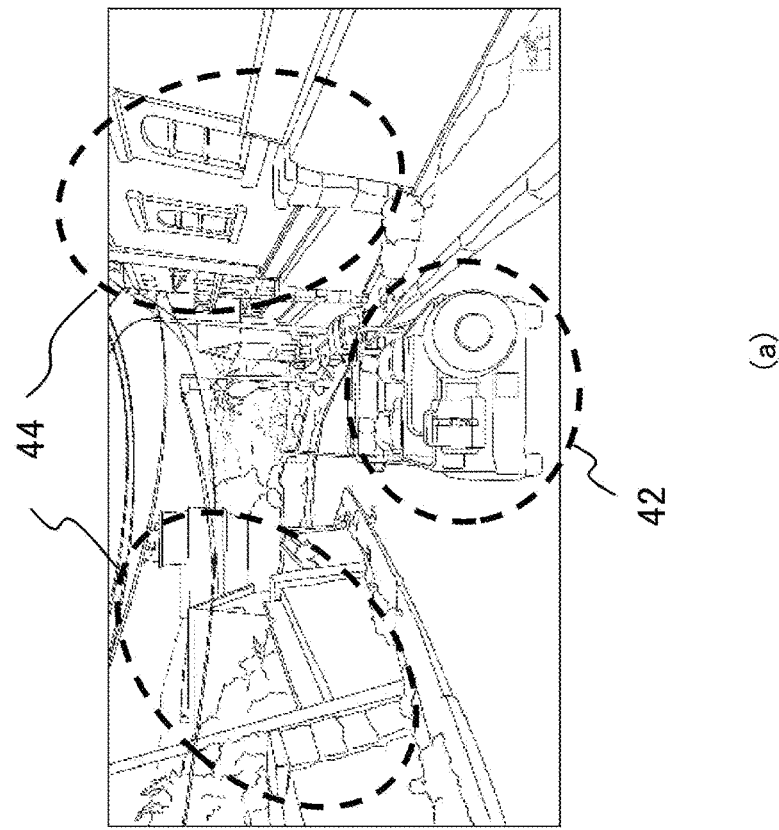
FIG.13

FIG. 17

| | | | | | | | | |
|---|---|---|---|---|---|---|---|---|
| | | | | | | | | |
| | | 8 | 16 | 24 | 32 | | | 62b |
| | | 4 | 12 | 20 | 28 | | 64b | |
| | | 2 | 10 | 18 | 26 | | | |
| | | 6 | 14 | 22 | 30 | | | |
| | | | | | | | | |
| | | | | | | | | 60 |
| | | | | | | | | |
| | | 7 | 15 | 23 | 31 | | | |
| | | 3 | 11 | 19 | 27 | | 64a | 62a |
| | | 1 | 9 | 17 | 25 | | | |
| | | 5 | 13 | 21 | 29 | | | |
| | | | | | | | | |

FIRST PARTIAL IMAGE / SECOND PARTIAL IMAGE / THIRD PARTIAL IMAGE / FOURTH PARTIAL IMAGE / FIFTH PARTIAL IMAGE / SIXTH PARTIAL IMAGE

IMAGE DATA TRANSFER APPARATUS, IMAGE DISPLAY SYSTEM, AND IMAGE DATA TRANSFER METHOD

TECHNICAL FIELD

The present invention relates to an image data transfer apparatus, an image display system, and an image data transfer method for processing data of to-be-displayed moving images.

BACKGROUND ART

Due to the enhancement of the information processing technology and the image display technology in recent years, it has become possible to experience visual worlds in various forms. For example, by displaying a panoramic video on a head-mounted display and displaying images corresponding to the line of sight of a user, it is possible to enhance the sense of immersion into a visual world or enhance the operability of an application such as a video game, for example. In addition, displaying image data stream-transferred from a server having abundant resources enables users to enjoy high-definition moving images and game screens irrespective of locations and scales.

SUMMARY

Technical Problem

Technologies of transferring and displaying image data can face a problem of delay time due to communication, irrespective of the system configuration. For example, in a case where user operation is reflected on display images, bidirectional data traffic for transmission of the contents of the operation to a transfer source and for transmission of image data from the transfer source becomes necessary, and there can be delay time that cannot be overlooked, in some cases. In a case where a head-mounted display is a display destination, images are displayed with delay relative to motions of a user's head, and this may impair realistic feeling or cause visually induced motion sickness, for example. This problem is likely to be more apparent if a higher image quality is pursued.

The present invention has been made in view of such a problem, and an object thereof is to provide a technology that makes it possible to pursue both image quality and delay time reduction in an image display process involving data transfer.

Solution to Problem

In order to solve the problem described above, an aspect according to the present invention relates to an image data transfer apparatus. The image data transfer apparatus includes an image generating section that performs rendering of a to-be-displayed moving image, a compressing/encoding section that compresses and encodes data of the moving image while referring to a rate control map on which an image quality deterioration tolerance is set for each compression unit on a plane of a frame included in the moving image, setting a target value corresponding to the rate control map, and controlling a data size, and a communication section that stream-transfers the compressed and encoded data of the moving image.

Another aspect according to the present invention relates to an image display system. The image display system includes the rendered image data transfer apparatus including an image generating section that performs rendering of images at different resolutions on a plane of a frame, and an image processing apparatus that acquires data of a moving image stream-transferred by the image data transfer apparatus and causes the moving image to be displayed. The image processing apparatus includes an image data acquiring section that acquires a map representing a distribution of resolutions on a plane of a frame adopted for rendering of the frame by the image generating section and also acquires data of the frame, and a decoding/decompressing section that decodes and decompresses the data of the frame and then converts the data of the frame into data with uniform resolutions on the basis of the map.

A still another aspect according to the present invention also relates to an image display system. The image display system includes the image data transfer apparatus including an image generating section that provides a region where a pixel value is computed for a set of a plurality of pixels according to contents of an image, and an image processing apparatus that acquires data of a moving image stream-transferred by the image data transfer apparatus and causes the moving image to be displayed. The image processing apparatus includes an image data acquiring section that acquires the pixel map adopted for rendering of a frame by the image generating section and also acquires data of the frame, and a decoding/decompressing section that decodes and decompresses the data of the frame and then converts the data of the frame into data with uniform resolutions on the basis of the pixel map.

A still another aspect according to the present invention also relates to an image display system. The image display system includes the image data transfer apparatus including a communication section that transfers data obtained after compression and encoding, for each partial image that is formed by splitting the plane of the frame according to a predetermined rule and includes a plurality of compression units, and a compressing/encoding section that decides a compression/encoding order of the compression units in the partial image according to the image quality deterioration tolerances, and an image processing apparatus that acquires data of a moving image stream-transferred by the image data transfer apparatus and causes the moving image to be displayed. The image processing apparatus includes an image data acquiring section that acquires a processing order map, adopted by the compressing/encoding section, representing a compression/encoding order of compression units and also acquires data of the partial image, and a decoding/decompressing section that decodes and decompresses the data of the partial image in compression units and then rearranges the data of the partial image in an order on an original image.

A still another aspect according to the present invention relates to an image data transfer method. The image data transfer method includes a step of performing rendering of a to-be-displayed moving image, a step of compressing and encoding data of the moving image while referring to a rate control map on which an image quality deterioration tolerance is set for each compression unit on a plane of a frame included in the moving image, setting a target value corresponding to the rate control map, and controlling a data size, and a step of stream-transferring the compressed and encoded data of the moving image.

Note that any combination of the constituent elements described above and ones that are obtained by conversion of expressions of the present invention between a method, an apparatus, a system, a computer program, a data structure, a recording medium, and the like are also valid as aspects of the present invention.

Advantageous Effect of Invention

According to the present invention, it is possible to pursue both image quality and delay time reduction in an image display process involving data transfer.

BRIEF DESCRIPTION OF DRAWINGS

FIG. 5 is a figure depicting an example of a rate control map in the present embodiment.

FIG. 8 depicts figures for explaining advantages of performing feedback control by use of a rate control map in the present embodiment.

FIG. 13 is a figure for explaining another example of the processing contents, of the image generating section, that can be used for generation of a rate control map in the present embodiment.

FIG. 17 is a figure schematically depicting an example of setting the order of a compression/encoding process in a partial image in a case where the processing order is made variable in the present embodiment.

DESCRIPTION OF EMBODIMENT

First Embodiment

Figure 1:
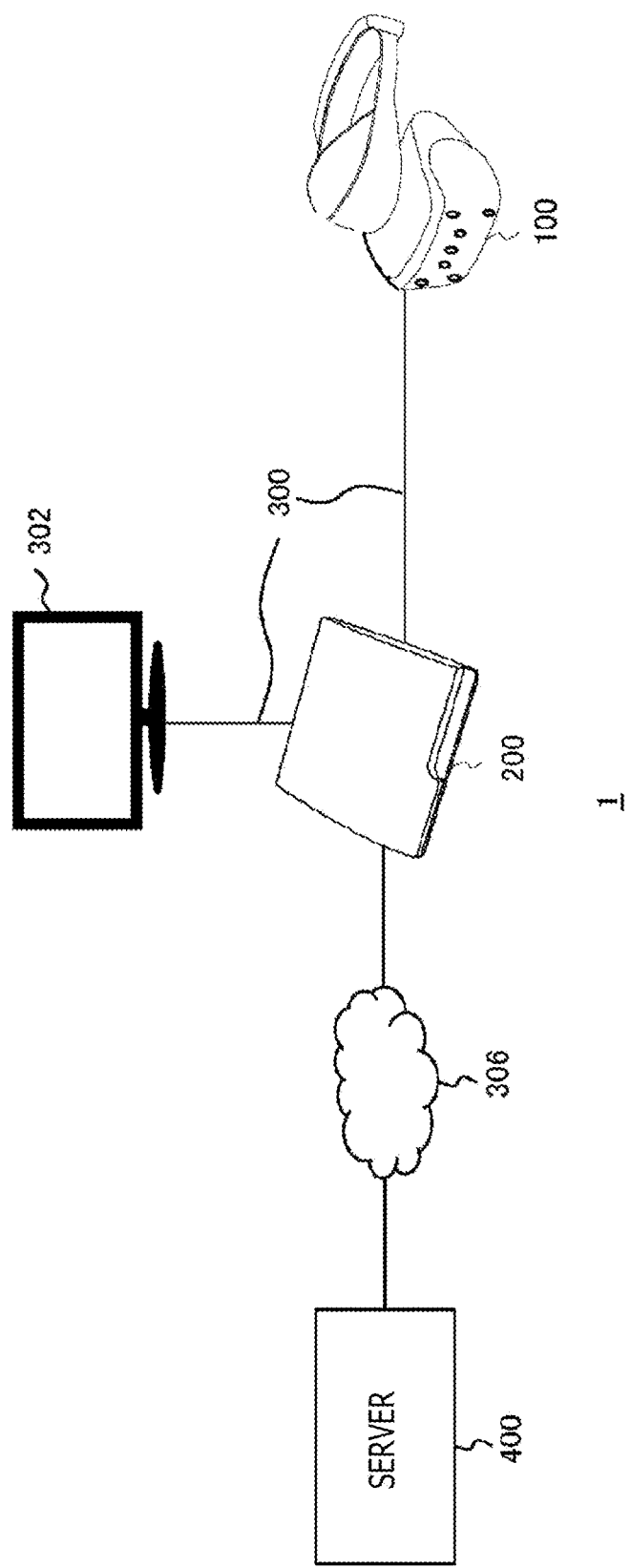
FIG. 1 is a figure depicting a configuration example of an image processing system in the present embodiment.

FIG. 1 depicts a configuration example of an image processing system in the present embodiment. An image display system 1 includes an image processing apparatus 200, a head-mounted display 100, a flat panel display 302, and a server 400. The image processing apparatus 200 is connected to the head-mounted display 100 and the flat panel display 302 by wireless communication or an interface 300 such as a USB (Universal Serial Bus) Type-C or HDMI (High-Definition Multimedia Interface) (registered trademark). The image processing apparatus 200 is further connected to the server 400 via a network 306 such as the Internet or a LAN (Local Area Network).

As an image data transfer apparatus, the server 400 generates at least some of to-be-displayed images, and transmits the images to the image processing apparatus 200. Here, the server 400 may be a server at an enterprise or the like that provides various types of distribution service such as cloud gaming or may be a home server that transmits data to certain terminals or the like. Accordingly, the network 306 is not limited in terms of its scale, and may be a public network such as the Internet, a LAN, or the like. For example, the network 306 may be one that uses a mobile phone carrier network, a Wi-Fi (Wireless Fidelity) spot in town, or a Wi-Fi access point at home. Alternatively, the image processing apparatus 200 and the server 400 may be directly connected to each other by a video interface.

The image processing apparatus 200 implements a process necessary for image data transmitted from the server 400, and outputs the data to at least either the head-mounted display 100 or the flat panel display 302. For example, the server 400 receives user operation or motions of the heads of a plurality of users each wearing a head-mounted display 100 from a plurality of image processing apparatuses 200 connected to the head-mounted displays 100. Then, rendering of a virtual world that is changed corresponding to the user operation and is within a field of view corresponding to the motions of each user's head is performed, and the rendered image is transmitted to the corresponding image processing apparatus 200.

The image processing apparatus 200 converts the transmitted image data into a format suited for the head-mounted display 100 or the flat panel display 302 as necessary, and then outputs the image data to the head-mounted display 100 and the flat panel display 302 at appropriate timings. By repeating such a process for each frame of a moving image, a cloud gaming system in which a plurality of users participate can be realized. At this time, the image processing apparatus 200 may output images transmitted from the server 400 to the head-mounted display 100 or the flat panel display 302 after synthesizing the images with UI (User Interface) plane images (also called OSD (On Screen Display) plane images) prepared separately or images captured by a camera included in the head-mounted display 100.

The image processing apparatus 200 also may enhance the display followability in response to motions of the head, by correcting images transmitted from the server 400, on the basis of the position and posture immediately before a display process by the head-mounted display 100. By causing also the flat panel display 302 to display images in a similar field of view, the image processing apparatus 200 may allow other users to see images that are seen by the user wearing the head-mounted display 100.

It should be noted that contents of to-be-displayed moving images and their display destinations are not particularly limited to any kind in the present embodiment. For example, the server 400 may treat images captured by an undepicted camera as to-be-displayed images and distribute the images to the image processing apparatus 200 in real time. At this time, the server 400 may acquire multi-viewpoint images obtained by capturing images of an event venue of a sporting event, a concert, or the like by using a plurality of cameras, produce, by using the images, images as seen in fields of view according to motions of the head-mounted display 100, to thereby generate a live video of free viewpoints and distribute the video to each image processing apparatus 200.

In addition, the configuration of a system to which the present embodiment can be applied is not limited to the one depicted in FIG. 1. For example, a display apparatus connected to the image processing apparatus 200 may be either one of the head-mounted display 100 and the flat panel display 302 or may be a plurality of head-mounted displays 100. In addition, the image processing apparatus 200 may be built in the head-mounted display 100 or the flat panel display 302. For example, a flat panel type display and an image processing apparatus may be a personal computer or a mobile terminal (a portable game console, a high-function mobile phone, or a tablet terminal) including the flat panel type display and the image processing apparatus integrally.

It may be made possible to further connect at least either the head-mounted display 100 or the flat panel display 302 to the apparatus as necessary. An input apparatus which is not depicted may be built in or connected to the image processing apparatus 200 or the terminal. In addition, the number of image processing apparatuses 200 connected to the server 400 is not limited to any number. Further, the server 400 may receive, from a plurality of image processing apparatuses 200 connected to the flat panel displays 302, the contents of operation by a plurality of users viewing images on and listening to sounds from their flat panel displays 302, may generate images corresponding to the contents, and then may transmit the images to the corresponding image processing apparatuses 200.

Further, the present embodiment can be applied not only to the combination of the server 400 and the image processing apparatuses 200, but also to other apparatuses as long as the apparatuses are an apparatus that transfers image data and an apparatus that receives the image data and that outputs the image data to display panels. For example, the former may be a game apparatus, an image processing apparatus, or the like, the latter may be a display apparatus that is provided integrally with a display panel, and both may be placed in a local environment where a user is present. Alternatively, the present embodiment may be applied to a terminal, a display apparatus, or the like including all the apparatuses integrally. In this case, image data is transferred through a bus or the like constructed inside the apparatus. In this manner, an image data transfer path is not limited to any kind in the present embodiment.

Figure 2:
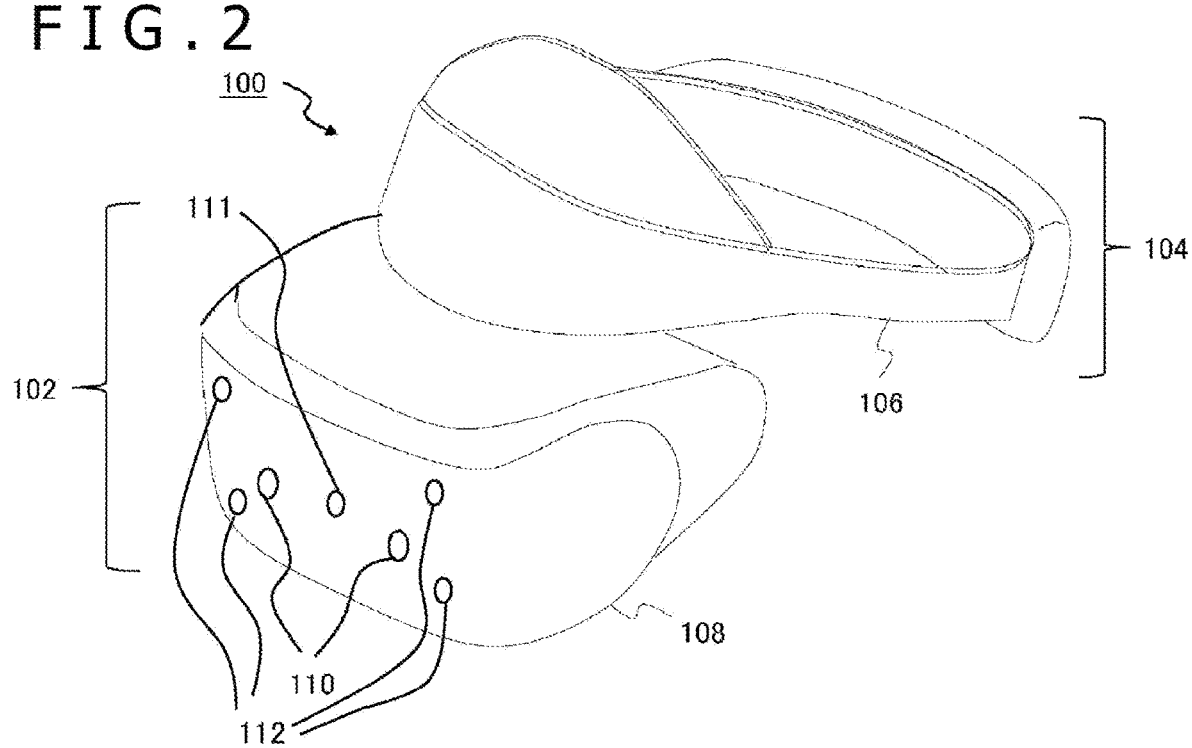
FIG. 2 is a figure depicting an appearance example of a head-mounted display according to the present embodiment.

FIG. 2 depicts an appearance example of the head-mounted display 100. In this example, the head-mounted display 100 includes an output mechanism section 102 and an attachment mechanism section 104. The attachment mechanism section 104 includes an attachment band 106 that surrounds the head when put on a user and that realizes fixation of the apparatus. The output mechanism section 102 includes a housing 108 having such a shape that the left and right eyes are covered in a state where the head-mounted display 100 is worn by the user, and includes therein a display panel such that it faces the eyes when worn by the user.

The housing 108 further includes therein eye pieces that are positioned between the eyes of the user and the display panel when the head-mounted display 100 is worn by the user and present images as expanded images. In addition, the head-mounted display 100 may further include speakers or earphones at positions corresponding to the ears of the user when worn by the user.

The head-mounted display 100 further includes stereo cameras 110 on the front face of the housing 108, a wide-viewing-angle monocular camera 111 at the middle, and four wide-viewing-angle cameras 112 at the four upper left, upper right, lower left, and lower right corners. These cameras capture moving images of the real space in a direction in which the user's face faces. In an aspect, the head-mounted display 100 provides a see-through mode in which moving images captured by the stereo camera 110 are immediately displayed to thereby present images representing how the real space in a direction that the user faces appears, with no changes being made thereto.

In addition, at least any one of images captured by the stereo camera 110, the monocular camera 111, and the four cameras 112 may be used for generation of a display image. For example, the position and posture of the head-mounted display 100 and, consequently, the position and posture of the user's head, relative to a surrounding space may be acquired at a predetermined rate by SLAM (Simultaneous Localization and Mapping), the field of view of an image to be generated may be decided at the server 400, the image may be corrected at the image processing apparatus 200. Alternatively, at the image processing apparatus 200, a captured image may be synthesized with an image transmitted from the server 400, and a resultant image may be used as a display image.

In addition, the head-mounted display 100 may include therein any of motion sensors for deriving the position, posture, and motions of the head-mounted display 100, such as an acceleration sensor, a gyro sensor, or a geomagnetic sensor. In this case, on the basis of measurement values of the motion sensor, the image processing apparatus 200 acquires information regarding the position and posture of the user's head at a predetermined rate. This information can be used for deciding the field of view of an image to be generated at the server 400 and correcting the image at the image processing apparatus 200, for example.

Figure 3:
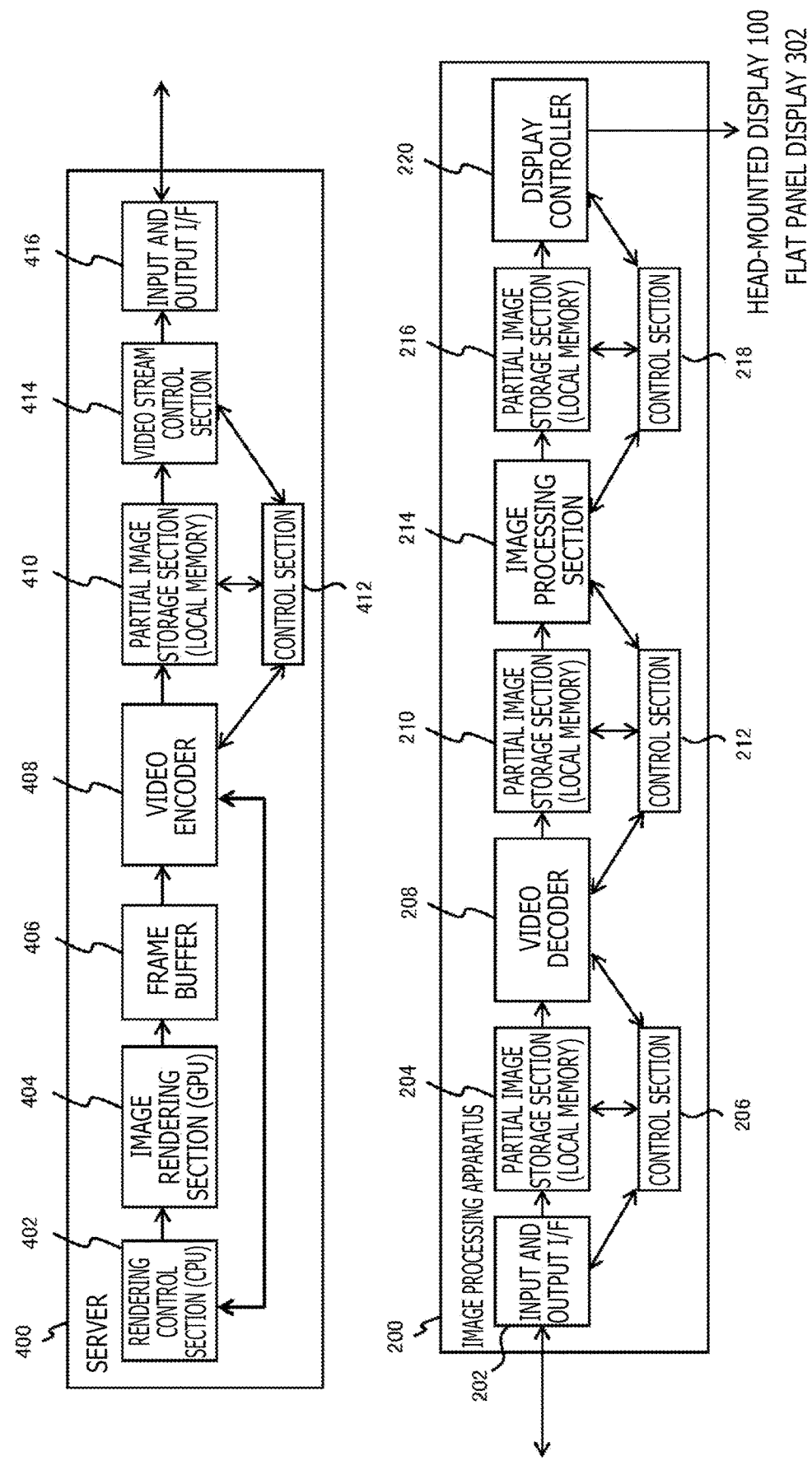
FIG. 3 is a figure depicting the basic configuration of a server and an image processing apparatus in the present embodiment.

FIG. 3 depicts the basic configuration of the server 400 and the image processing apparatus 200 in the present embodiment. The server 400 and the image processing apparatus 200 in the present embodiment include, at their important places, local memories that store partial images which are smaller than one frame of a display image. Then, image data compression/encoding and transmission at the server 400 and data reception, decoding/decompression, various types of image processing, and output to a display apparatus at the image processing apparatus 200 are pipeline-processed in units of the partial images. As a result, delay time from image rendering at the server 400 until a process of displaying an image on the display apparatus connected to the image processing apparatus 200 is reduced.

At the server 400, a rendering control section 402 is realized by a CPU (Central Processing Unit), and controls image rendering at an image rendering section 404. As described above, contents of images to be displayed in the present embodiment are not particularly limited to any kind, and, for example, the rendering control section 402 moves a cloud game forward and causes the image rendering section 404 to perform rendering of frames of a moving image representing results thereof. At this time, the rendering control section 402 may acquire information related to the position and posture of the user's head from the image processing apparatus 200 and perform control such that rendering of each frame is performed to reproduce a field of view corresponding to the information.

The image rendering section 404 is realized by a GPU (Graphics Processing Unit), performs rendering of frames of a moving image at a predetermined or variable rate under the control of the rendering control section 402, and stores results thereof on a frame buffer 406. The frame buffer 406 is realized by a RAM (Random Access Memory). Under the control of the rendering control section 402, a video encoder 408 compresses and encodes image data stored on the frame buffer 406, in units of partial images smaller than one frame. Partial images are each an image in a region that is formed by splitting the image plane of a frame along boundary lines that are set in the lateral direction, in the vertical direction, in both the vertical and horizontal directions, or in diagonal directions, for example.

At this time, upon completion of rendering, by the image rendering section 404, of images necessary for the compression and encoding, the video encoder 408 may start compression and encoding of the frame without waiting for a vertical synchronizing signal from the server. According to a conventional technology in which various types of processes such as rendering or compression and encoding of frames are synchronized by use of a vertical synchronizing signal as a reference signal, it is easy to manage the order of frames by making time given to each process from rendering of an image until a process to display the image the same for each frame. However, in this case, a compression/encoding process needs to wait for the next vertical synchronizing signal even if a rendering process has ended earlier due to the contents of a frame. In the present embodiment, as described later, the generation time of each partial image unit is managed to thereby avoid generation of wasted waiting time.

An encoding method used for compression and encoding by the video encoder 408 may be a typical encoding method such as H.264/AVC (Advanced Video Coding) or H.265/HEVC (High Efficiency Video Coding). The video encoder 408 stores compressed and encoded image data on a partial image storage section 410. The partial image storage section 410 is a local memory realized by a SRAM (Static Random Access Memory) or the like, and has a storage region corresponding to data sizes of partial images smaller than one frame. The same applies to "partial image storage sections" described later. Every time compressed and encoded partial image data is stored on the partial image storage section 410, a video stream control section 414 reads out the data, and packetizes the data after including audio data, control information, and the like in the data as necessary.

A control section 412 constantly monitors the status of data writing on the partial image storage section 410 by the video encoder 408, the status of data readout from the partial image storage section 410 by the video stream control section 414, and the like, and appropriately controls operation of both the video encoder 408 and the video stream control section 414. For example, the control section 412 performs control such that a data underflow, that is, a buffer underrun, or a data overflow, that is, a buffer overrun, does not occur in the partial image storage section 410.

An input/output interface 416 establishes communication with the image processing apparatus 200, and sequentially transmits, via the network 306, data packetized by the video stream control section 414. In addition to image data, the input/output interface 416 may transmit audio data and the like as appropriate. The input/output interface 416 may further acquire, from the image processing apparatus 200, information related to user operation or the position and posture of the user's head, information related to a point of gaze of the user, and the like and supply them to the rendering control section 402, the video encoder 408, and the like.

At the image processing apparatus 200, an input/output interface 202 sequentially acquires image and audio data transmitted from the server 400. The input/output interface 202 may further acquire, as appropriate from the head-mounted display 100, an input apparatus which is not depicted, or the like, information related to user operation or the position and posture of the user's head, information related to a point of gaze of the user, and the like and transmit them to the server 400. The input/output interface 202 decodes packets acquired from the server 400, and then stores, on a partial image storage section 204, image data that is taken out.

The partial image storage section 204 is a local memory provided between the input/output interface 202 and a video decoder 208. A control section 206 constantly monitors the status of data writing on the partial image storage section 204 by the input/output interface 202, the status of data readout from the partial image storage section 204 by the video decoder 208, and the like, and appropriately controls operation of both the input/output interface 202 and the video decoder 208. Every time partial image data is stored on the partial image storage section 204, the video decoder 208 reads out the data, decodes and decompresses the data in accordance with a procedure according to an encoding method, and sequentially stores the data on a partial image storage section 210.

The partial image storage section 210 is a local memory provided between the video decoder 208 and an image processing section 214. A control section 212 constantly monitors the status of data writing on the partial image storage section 210 by the video decoder 208, the status of data readout from the partial image storage section 210 by the image processing section 214, and the like, and appropriately controls operation of both the video decoder 208 and the image processing section 214. Every time decoded and decompressed partial image data is stored on the partial image storage section 210, the image processing section 214 reads out the data, and implements a process necessary for a display process. For example, in order to allow a user to visually recognize an image without distortions when the user sees the image via the eye pieces on the head-mounted display 100, a correction process of giving distortions opposite to distortions generated by the eye pieces is implemented.

Alternatively, the image processing section 214 may refer to a UI plane image prepared separately and synthesize (superimpose) the UI plane image with (on) an image transmitted from the server 400. In addition, the image processing section 214 may synthesize an image captured by a camera included in the head-mounted display 100 with an image transmitted from the server 400. The image processing section 214 may also correct an image transmitted from the server 400, such that a field of view corresponding to the position and posture of the user's head at a time point of the process is reproduced. The image processing section 214 may also perform image processing such as a super-resolution process suited for output to the flat panel display 302.

In any case, the image processing section 214 implements a process in units of partial images stored on the partial image storage section 210, and continues sequentially storing the partial images on a partial image storage section 216. The partial image storage section 216 is a local memory provided between the image processing section 214 and a display controller 220. A control section 218 constantly monitors the status of data writing on the partial image storage section 216 by the image processing section 214, the status of data readout from the partial image storage section 216 by the display controller 220, and the like, and appropriately controls operation of both the image processing section 214 and the display controller 220.

Every time partial image data that has undergone image processing is stored on the partial image storage section 216, the display controller 220 reads out the data, and outputs the data to the head-mounted display 100 and the flat panel display 302 at appropriate timings.

Specifically, data of the uppermost partial image of each frame is output at timings matching vertical synchronizing signals of the displays, and thereafter, data of lower partial images are output sequentially.

Figure 4:
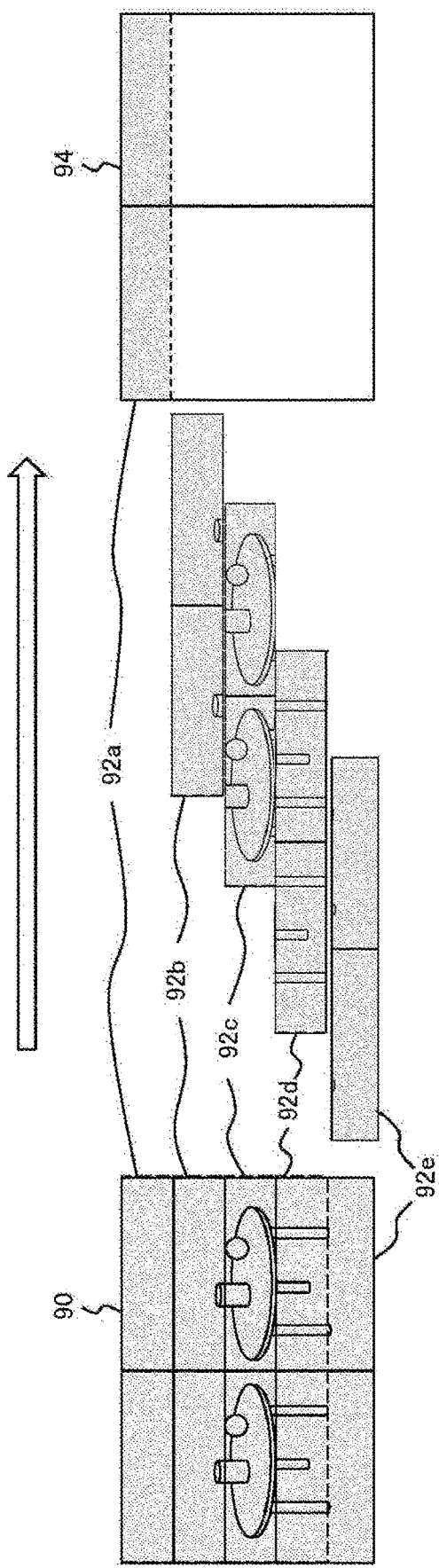
FIG. 4 is a figure conceptually depicting how it appears at a time of processes from image rendering to a display process in the present embodiment.

Next, a pipeline process of partial images realized at the server 400 and the image processing apparatus 200 from image rendering until a display process is explained. FIG. 4 conceptually depicts how it appears at a time of processes from image rendering to an image display process in the present embodiment. As described above, the server 400 generates frames 90 of a moving image at a predetermined or variable rate. Whereas a frame 90 includes two equally-divided left and right regions each of which is for a corresponding one of left-eye and right-eye images in the example depicted in FIG. 4, this does not mean that the configuration of images generated at the server 400 is limited to this.

As described above, the server 400 compresses and encodes the frame 90 in units of partial images. In FIG. 4, the image plane is split into five in the horizontal direction, and partial images 92a, 92b, 92c, 92d, and 92e are formed. As a result, the partial images are compressed and encoded one after another in this order, and are transferred to and displayed by the image processing apparatus 200 as represented by an arrow. That is, while the uppermost partial image 92a is being subjected to processes of compression/encoding, transmission, decoding/decompression, and output to a display panel 94, partial images are sequentially transferred and displayed in order of the partial image 92b below the partial image 92a and the partial image 92c below the partial image 92b, and so on. As a result, various types of processes necessary from image rendering to a display process can be implemented in parallel, and the display process can be proceeded with minimum delay even if there is transfer time between the processes.

In the configuration described thus far, it is desirable that the size of to-be-transmitted data be reduced as much as possible in order to stably transmit the data with short delay from the server 400 to the image processing apparatus 200. On the other hand, for the purpose of providing user experience at a high level in terms of realistic feeling, sense of immersion, or the like about a displayed world, it is desirable that compression rates be not increased in order to maintain a certain degree of resolution or frame rate, and this creates a dilemma.

Particularly, in an aspect in which moving image data is transferred to the display panel of the head-mounted display 100 from a system or the like built in a mobile terminal which is not depicted or in the head-mounted display 100, other than the server 400 or the image processing apparatus 200, realization of higher resolutions, higher frame rates, and higher bit depths of display images are required. Because of this, compression and encoding of image data are necessary for reduction of a necessary transfer bandwidth. Irrespective of whether a transfer path is a cable path or a wireless path, a data size (bit rate) that can be transferred per unit time is determined by technologies used, and it is therefore necessary to make a data size obtained after compression equal to or smaller than the transferrable data size.

On the other hand, the compression rate of each frame included in a moving image varies depending on the contents of the image. Typically, if an image to be compressed has a feature that the intensity of motions is high, the contents have many high-definition, high-frequency components, and other features, the compression rate lowers. Accordingly, for the purpose of reducing the size of compressed data that should be transferred per unit time to a size which is equal to or smaller than a predetermined value, rate control is performed in a compression/encoding process in some cases. Typically, rate control includes feedback control and feedforward control.

In feedback control, the size of compressed data which is actually generated as a result of image compression (encoding process) at a granularity (hereinafter, called a "compression unit") smaller than unit time defining a tolerated bit rate is compared with a target value, the next compression unit is compressed after adjusting parameters such that the difference therebetween decreases, and this process is repeated. Here, for example, the parameters to be adjusted are a QP (Quantization Parameter), a bit depth, an image resolution, and the like. In this method, changes to be made to the parameters in the adjustment become large when the difference from the target value is large, and consequently, there is a fear that there are large fluctuations of image quality among compression units.

Further, in feedback control, if there are consecutive compression units of images with low compression rates (whose data sizes are difficult to be reduced even after compression) and the bit rate might become higher than a bit rate upper limit per unit time, control is performed to increase compression rates sacrificing the image quality at a later stage of the unit time. Conversely, if there are consecutive compression units of images with high compression rates at an earlier stage of the unit time, the image quality can fluctuate to a good state only at a later stage in some cases. In any case, passive adjustments of data sizes are concentrated toward a later stage of the unit time, and the image quality balance of a frame as a whole does not become uniform in some cases.

In feedforward control, what is generally called multipath encoding is performed. In multipath encoding, the compression rate is estimated in advance by performing tentative compression of a subject frame in advance, and the data size per unit time is thereby adjusted by adjusting parameters of the main compression process in a planned manner. In a case of this method, the main compression process cannot be started until the tentative compression process is completed, and therefore, it takes a longer time to complete a compression/encoding process. As a result, delay time until a display process increases, and it is difficult to apply the technique to real time applications such as those related to virtual reality or augmented reality, for example.

In view of this, in the present embodiment, a rate control map representing regions that are on the plane of a frame included in a moving image and whose compression rates may be increased, that is, where image quality deterioration is tolerated to some extent, is prepared in advance, and compression rates are adjusted according to the map as necessary. FIG. 5 depicts an example of a rate control map. This example depicts a rate control map 6 for compressing and encoding left-eye and right-eye images whose display destination is the head-mounted display 100.

That is, the rate control map 6 includes a left-eye region 8a and a right-eye region 8b. In addition, for each of compression units formed by splitting the plane of one frame including left-eye and right-eye images into 32 in the vertical direction and into 16 in the lateral direction, the extent of tolerated image quality deterioration (hereinafter, called an "image quality deterioration tolerance") is set as an integer from 0 to 10. That is, the larger the numerical value of a compression unit is, the higher the image quality deterioration tolerance due to an increase of the compression rate is.

In a case of the head-mounted display 100, images of objects that are closer to the optical axes of the eye pieces tend to be expanded larger, and visually recognized in more detail by a user. Accordingly, in this example, in each of the left-eye region 8a and the right-eye region 8b, the image quality deterioration tolerances of a middle region which is near the optical axis are set to "0," and the tolerances of portions closer to the periphery are set larger. For example, changes of the tolerances in this case are decided on the basis of optical parameters such as aberrations of the eye pieces. In addition, because portions near the outermost periphery in each region are located outside the field of view of the eye piece, the tolerances are set to the maximum value, "10."

It should be noted that the format of the rate control map 6 is not limited to the one depicted in the figure. For example, numerical values representing image quality deterioration tolerances may be binary numbers representing whether deterioration is tolerated or is not tolerated, and any number of other steps may be provided. In addition, compression units for which image quality deterioration tolerances are set on the rate control map 6 are suitably minimum units (e.g. macroblocks) for which compression and encoding are performed, or regions having an area size which is an integer multiple of the area size of the minimum blocks. Note that the display destination is not limited to the head-mounted display 100. Accordingly, the configuration of the rate control map 6 is not limited to one provided with two regions as depicted in the FIG. 5, but may be changed as appropriate according to the structure of a display panel.

In any case, in a case where optical parameters of the eye pieces are used or in a case where it is possible to limit the portion at which a user is likely to gaze to the center of an image or the like, the rate control map 6 can be generated in advance. It should be noted that the rate control map 6 may be data that is determined dynamically on the basis of the status at a time of image generation, the contents of images, a point of gaze of a user, and the like.

In addition, in the present embodiment, an adjustment of data sizes by use of the rate control map 6 is implemented as necessary. For example, an adjustment using the rate control map 6 is not performed on an image whose data size obtained after compression can be made small even with a normal compression/encoding process and whose bit rate does not become higher than a bit rate upper limit. A normal process may also be performed on an image whose data size is not significantly different from a target value in feedback control. By performing an adjustment using the rate control map 6 as necessary in this manner, it is possible to avoid wasteful lowering of image quality or an increase of the processing load, for example.

Although, as a conventional technology, there is a method in which a compression process placing emphasis on image quality is specified for a region at the center of the field of view by using a static map representing regions where emphasis should be placed on image quality or by dynamically specifying ROI (Region of Interest), it is not possible to dynamically change adjustment parameters on the basis of the transitional state of a generated amount of compressed data that varies depending on the contents of a subject image. Therefore, there is a problem that image quality is lowered even in a case where it is not necessary, for example. That is, if regions where emphasis should be placed on image quality are specified, a uniform process is performed on the basis of the specification in some cases without taking into consideration the past transition of rate control or the current status.

In the present embodiment, a compression process may be executed with the feedback control using the rate control map 6 being kept enabled constantly, instead of selectively enabling or disabling the feedback control. In the present embodiment, in a case where the latest cumulative data size is smaller than a target value or compression to a sufficient image quality and amount of data is possible even with normal quantization parameters on a region where emphasis should be placed on image quality, for example, rate control serves its function effectively even for a region, on the rate control map 6, where emphasis should be placed on image quality. As a result, unnecessary lowering of quantization parameters, for example, is not performed. This is because the rate control map 6 is a guidance hint for rate control and does not specify fixed quantization parameter values.

Figure 6:
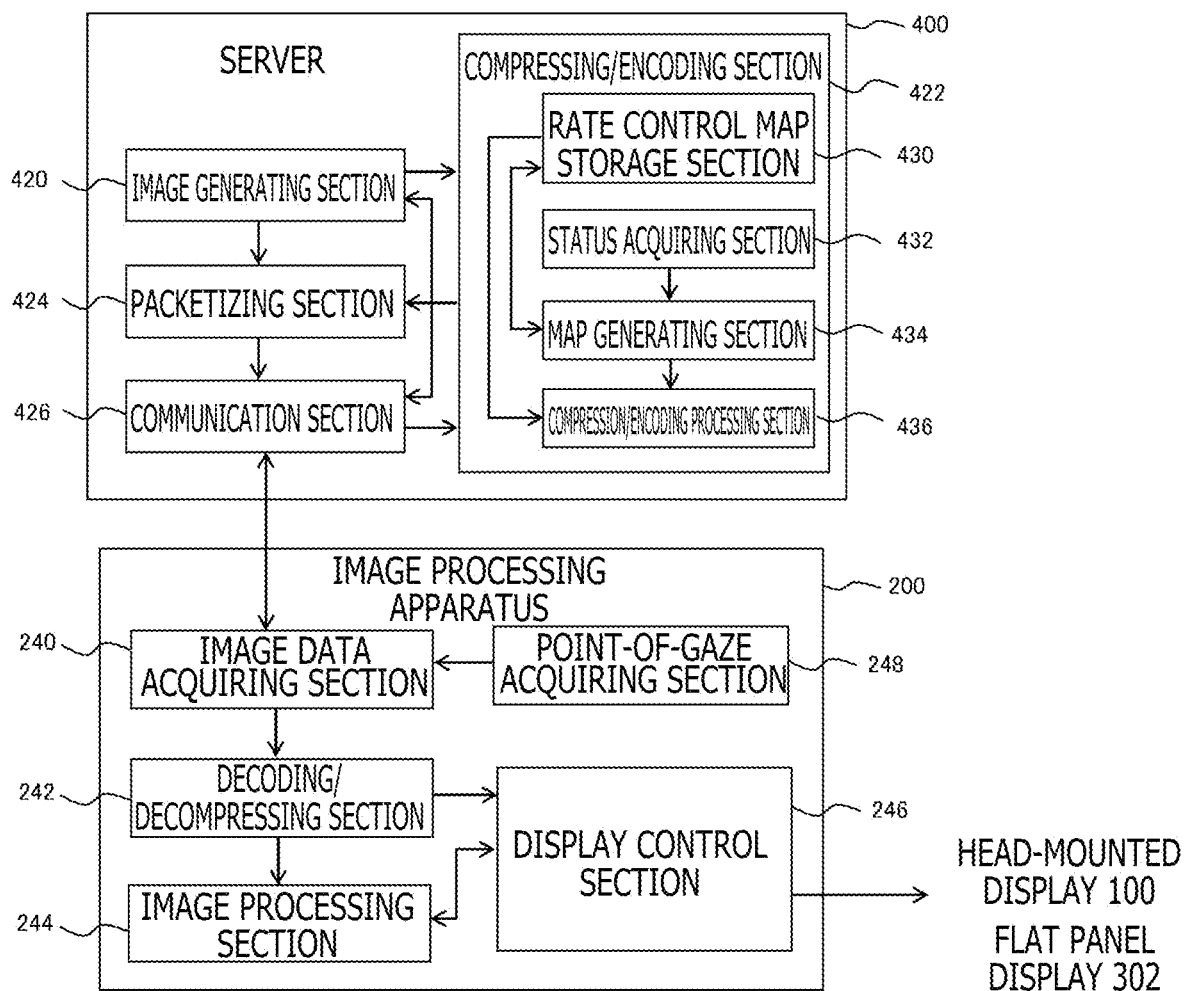
FIG. 6 is a figure depicting functional blocks of the server and the image processing apparatus according to the present embodiment.

FIG. 6 depicts functional blocks of the server 400 and the image processing apparatus 200 according to the present embodiment. Each functional block depicted in FIG. 6 and FIG. 18 described later can be realized hardware-wise by a CPU, a GPU, an encoder, a decoder, an arithmetic logic unit, various types of memories, or the like, and is realized software-wise by a program that is loaded onto a memory from a recording medium and that exhibits functions such as an information processing function, an image rendering function, a data input and output function, or a communication function. Accordingly, it is understood by those skilled in the art that these functional blocks can be realized in various forms by only hardware, by only software, or by a combination of hardware and software, and the forms to realize them are not limited to any of them. The same applies to functional blocks described later.

The server 400 includes an image generating section 420, a compressing/encoding section 422, a packetizing section 424, and a communication section 426. The image generating section 420 includes the rendering control section 402, the image rendering section 404, and the frame buffer 406 depicted in FIG. 3, and generates, at a predetermined or variable rate, frames of a moving image, such as a game image, that should be transmitted to the image processing apparatus 200. Alternatively, the image generating section 420 may acquire moving image data from an undepicted camera, an undepicted storage apparatus, or the like. In this case, the image generating section 420 can be read as meaning an image acquiring section. The same applies to the following explanation.

The compressing/encoding section 422 includes the video encoder 408, the partial image storage section 410, and the control section 412 depicted in FIG. 3, and compresses and encodes, in units of partial images, image data generated by the image generating section 420. Here, the compressing/encoding section 422 performs motion compensation or encoding treating, as compression units, regions including a predetermined number of rows such as one row or two rows or rectangular regions with a predetermined size such as 16×16 pixels or 64×64 pixels. Accordingly, when data of a minimum unit region necessary for compression and encoding has been generated by the image generating section 420, the compressing/encoding section 422 may start the compression and encoding.

Note that partial images which are the units of a pipeline process of compression/encoding and transmission may be the same as the minimum unit regions or may be regions larger than them. Specifically, the compressing/encoding section 422 includes a rate control map storage section 430, a status acquiring section 432, a map generating section 434, and a compression/encoding processing section 436. As illustrated in FIG. 5, the rate control map storage section 430 stores a rate control map representing an image quality deterioration tolerance for each compression unit. In a case where there are different rate control maps appropriate for different display apparatuses on which the image processing apparatus 200 causes images to be displayed, the rate control map storage section 430 stores the rate control maps in association with model IDs or the like of the display apparatuses.

The status acquiring section 432 acquires information related to various statuses that can have influence on a distribution of image quality deterioration tolerances. For example, the status acquiring section 432 acquires information generated or used at a time of generation of moving images by the image generating section 420. For example, in a case where the image generating section 420 performs control such that image resolutions decrease from the center of the field of view toward the periphery, a resolution map representing a distribution of resolutions on the plane of a frame has been acquired. In this case, the status acquiring section 432 acquires the resolution map.

Alternatively, in a case where the image generating section 420 performs computation of pixel values (pixel shading) for a set of a plurality of neighboring pixels such as those at ends of a field of view, those in a region where motions of objects are small, or those in a region with low elaborateness, a pixel map representing the set of the pixels on the plane of a frame is acquired. In this case, the status acquiring section 432 acquires the pixel map. Alternatively, in a case where the image generating section 420 performs foveated rendering in which resolutions are changed according to distances from a point of gaze of a user on a displayed image, the status acquiring section 432 acquires a distribution of the resolutions.

Alternatively, the status acquiring section 432 may acquire, from the image processing apparatus 200, information related to a point of gaze of a user on a displayed image. For example, the status acquiring section 432 acquires status information at a frequency which is appropriate according to the type of the information, such as at the start of a moving image transfer process, for each partial image, for each frame, or for each scene.

On the basis of the information acquired by the status acquiring section 432, the map generating section 434 generates a rate control map. Qualitatively, as resolutions of images lower or as distances from a point of gaze increase, the image quality deterioration tolerances on the rate control map are increased. According to such a criteria, a rate control map can be generated individually from each piece of status information, and the map generating section 434 may thus generate one rate control map on the basis of any one piece of status information acquired by the status acquiring section 432.

Alternatively, the map generating section 434 may generate one rate control map by combining a plurality of pieces of status information. For example, the map generating section 434 may create a rate control map by using at least either of a resolution map and a pixel map, and then may create a final rate control map by adding, to each tolerance set on the rate control map, an offset value computed according to a distribution of resolutions or distances from a point of gaze of a user according to foveated rendering.

Alternatively, the map generating section 434 may read out a rate control map stored in advance on the rate control map storage section 430 and create a final rate control map by correcting the rate control map on the basis of information acquired by the status acquiring section 432. In this case also, it is sufficient if an offset value of a tolerance is computed from at least any one of various types of information acquired by the status acquiring section 432 and is added to each tolerance set on the original rate control map.

It should be noted that a formula for computing tolerances is not limited to one in which tolerances obtained from each perspective are added simply, but linear combination or the like may be performed after performing weighting set for each perspective. There are various other techniques for calculating some type of evaluation values from multi-dimensional parameters, and any of them may be adopted in the present embodiment.

As described above, the compression/encoding processing section 436 compresses and encodes moving image data generated by the image generating section 420. At this time, the compression/encoding processing section 436 basically proceeds with the compression and encoding of a compression unit while adjusting the compression rate by a typical technique of feedback control such that the cumulative value per unit time of data sizes obtained after the compression and encoding approaches a target value. Here, when a predetermined condition under which the data size should be reduced significantly such as a condition that the cumulative value of data sizes has become larger than the target value and the difference therebetween is equal to or greater than a predetermined threshold value is satisfied, the compression/encoding processing section 436 refers to a rate control map, and makes an adjustment to increase compression rates at appropriate regions on the image.

At this time, the compression/encoding processing section 436 may refer to a static rate control map stored on the rate control map storage section 430, or may refer to a rate control map that is generated or corrected dynamically by the map generating section 434. Then, the compression/encoding processing section 436 performs feedback control after resetting a data size target value for each compression unit according to the rate control map. Data size target values are thereby lowered for regions where image quality deterioration is tolerated. As a result, control is performed to increase the compression rates of the regions.

Increases of the compression rates of regions where image quality deterioration tolerances are high are prioritized in this manner, and the data size as a whole can thereby be reduced while influence on regions where image quality is desired to be maintained is suppressed. Note that the compression/encoding processing section 436 may first implement a tentative compression process of an image and cause results of the tentative compression process to be reflected on a rate control map. That is, compression and encoding are performed by using tentative parameters, and a data size obtained after the compression and encoding is acquired to estimate the readiness of compression of each compression unit.

For compression units whose data sizes are difficult to be reduced by compression, the image quality deterioration tolerances on the rate control map are set low, and it is thereby possible to prevent undesirable, significant deterioration of images due to inappropriate compression. In this case, the compression/encoding processing section 436 implements the main process of a compression/encoding process by using the rate control map generated or corrected on the basis of results of the tentative compression process.

In addition, the compression/encoding processing section 436 may not only repeat compression and encoding for each compression unit sequentially starting from an end of a partial image, but may proceed with compression and encoding sequentially starting from portions where image quality deterioration tolerances are low, that is, starting from important portions. Here, the compression/encoding processing section 436 may use a rate control map for deciding a processing order. By temporally prioritizing compression and encoding of important portions, it is possible to avoid a situation where the important portions are used for passive adjustments in a state where the cumulative value of data sizes almost reaches a bit rate upper limit at a later stage of unit time in the manner described above.

Accordingly, data sizes can be reduced to proper values without influence on compression results of important portions no matter what images of other regions of a partial image are like. At this time, the compression/encoding processing section 436 may prevent compression rates from changing significantly, by tolerating differences between data sizes and target values at an earlier stage of unit time, and make compression results of important portions more stabilized by rapidly causing data sizes to converge to target values toward a later stage. The compressing/encoding section 422 sequentially supplies partial image data obtained after compression and encoding to the packetizing section 424.

The packetizing section 424 includes the video stream control section 414 and the control section 412 depicted in FIG. 3, and packetizes, in a format according to a communication protocol to be used, compressed and encoded partial image data. At this time, data such as a time at which rendering of the partial image is performed (hereinafter, called a "generation time"), a distribution of resolutions on an image plane, quantization parameters used for compression and encoding, or a resolution map or a pixel map described above is acquired from the image generating section 420 or the compressing/encoding section 422 and thereby associated with the partial image data.

The communication section 426 includes the input/output interface 416 depicted in FIG. 3, and transmits packets including compressed and encoded partial image data and various types of data associated therewith to the image processing apparatus 200. With these configurations, the server 400 performs compression/encoding, packetization, and transmission in parallel by performing a pipeline process in partial image units smaller than one frame.

The image processing apparatus 200 includes an image data acquiring section 240, a decoding/decompressing section 242, an image processing section 244, a display control section 246, and a point-of-gaze acquiring section 248. Note that the decoding/decompressing section 242 and the image processing section 244 have common functions in a sense that they implement a predetermined process on partial image data and generate partial image data for a display process, and at least either of them can also be collectively referred to as an "image processing section."

The image data acquiring section 240 includes the input/output interface 202, the partial image storage section 204, and the control section 206 depicted in FIG. 3, and acquires, from the server 400, compressed and encoded partial image data along with various types of data associated therewith. The decoding/decompressing section 242 includes the video decoder 208, the partial image storage section 210, the control section 206, and the control section 212 depicted in FIG. 3, and decodes and decompresses compressed and encoded partial image data. Here, upon acquisition, by the image data acquiring section 240, of data of a minimum unit region necessary for motion compensation or compression and encoding such as encoding, the decoding/decompressing section 242 may start a decoding/decompression process.

At this time, the decoding/decompressing section 242 appropriately decodes and decompresses each compression unit by using a distribution of quantization parameters transmitted from the server 400 and used at a time of compression and encoding. Further, by using information related to a distribution of resolutions on an image plane, that is, a resolution map or a pixel map described above, the decoding/decompressing section 242 may restore an original pixel array by performing interpolation of pixels, for example, and perform conversion into an image with uniform resolutions. The image processing section 244 includes the image processing section 214, the partial image storage section 216, the control section 212, and the control section 218 depicted in FIG. 3, implements a predetermined process on partial image data, and generates partial image data for a display process. For example, as described above, the image processing section 244 implements correction of giving opposite distortions taking into consideration distortions of the eye pieces included in the head-mounted display 100.

Alternatively, the image processing section 244 synthesizes, in partial image units, images, such as UI plane images, that should be displayed along with a moving image. Alternatively, the image processing section 244 acquires the position and posture of a user's head at that time point, and corrects an image generated by the server 400 such that a field of view at a time of a display process is reproduced correctly. As a result, a temporal difference that is generated between a motion of the user's head and a display image due to time for transfer from the server 400 can be minimized.

In addition, the image processing section 244 may implement any of or a combination of types of typically performed image processing. For example, the image processing section 244 may perform gamma curve correction, tone curve correction, contrast enhancement, and the like. That is, on the basis of characteristics of a display apparatus or a user specification, necessary offset correction may be performed for pixel values and luminance values of decoded and decompressed image data. In addition, the image processing section 244 may perform a noise removal process of performing a process such as superimposition, weighted averaging, or smoothing by referring to neighboring pixels.

In addition, the image processing section 244 may align an image data resolution and a display panel resolution, or may refer to neighboring pixels to perform bilinear, trilinear, etc., weighted averaging/oversampling or the like. In addition, the image processing section 244 may refer to neighboring pixels, determine an image texture type, and selectively perform a process of denoising, edge enhancement, smoothing, and tone/gamma/contrast correction according to the determined image texture type. At this time, the image processing section 244 may perform a process together with an image-size up-scaler/down-scaler.

In addition, the image processing section 244 may perform a format conversion in a case where the pixel format of image data and the pixel format of a display panel are different from each other. For example, conversion from YUV to RGB, from RGB to YUV, between 444, 422, and 420 in YUV, between 8, 10, and 12 bit colors in RGB, or the like may be performed. In addition, in a case where, while decoded image data is in a format supporting the luminance range of HDR (High Dynamic Range), the format of a display supports a narrower luminance range of HDR (the displayable luminance dynamic range is narrower than that defined in the HDR format, etc.), the image processing section 244 may perform a pseudo HDR process (color space change) of converting the format into the luminance range format of HDR in a range that is supported by the display panel while keeping as many features of the HDR image as possible.

In addition, in a case where decoded image data is in an HDR-supporting format but a display supports only SDR (Standard Dynamic Range), the image processing section 244 may perform color-space conversion into the SDR format while keeping as many features of the HDR image as possible. In a case where decoded image data is in an SDR-supporting format but a display supports HDR, the image processing section 244 may perform enhancement-conversion into the HDR format while conforming to characteristics of the HDR panel as much as possible.

In addition, in a case where the gradation expression capability of a display is low, the image processing section 244 may perform error diffusion addition, or may implement a dithering process which is a process to be performed along with pixel format conversion. In addition, in a case where there is a partial defect or anomaly in decoded image data due to loss or bit errors in network-transferred data, the image processing section 244 may perform a correction process on the region. In addition, the image processing section 244 may perform mono-color fill, correction by copying neighboring pixels, correction by neighboring pixels in the previous frame, or correction by using pixels that are estimated from surrounding portions in a past frame or the current frame according to adaptive defect correction.

In addition, the image processing section 244 may perform image compression for reducing the required band of an interface that outputs data from the image processing apparatus 200 to a display apparatus. At this time, the image processing section 244 may perform light-weight entropy encoding by referring to neighboring pixels, index-value referring encoding, Huffman encoding, and the like. In addition, in a case where a display apparatus adopts a liquid crystal panel, the reaction speed is slow while, on the other hand, a high resolution can be realized. In a case where a display apparatus adopts an organic EL (electroluminescent) panel, realization of a high resolution is difficult and a phenomenon called black smearing in which smearing of colors occurs in black regions and regions surrounding the black regions can occur, while, on the other hand, the reaction speed is fast.

In view of this, the image processing section 244 may perform correction such that such various negative influences of display panels are negated. For example, in a case of a liquid crystal panel, the image processing section 244 resets liquid crystal by inserting black images between frames and enhances the reaction speed. In addition, in a case of an organic EL panel, the image processing section 244 makes smearing of colors due to black smearing less noticeable by offsetting luminance values or gamma values in gamma correction.

The image processing section 244 may perform a super-resolution process (Super Resolution) of performing definition enhancement or performing restoration or reconstruction of high-frequency components on images. At this time, the image processing section 244 may convert images by inputting image data to a database or network model constructed in advance by using machine learning or deep learning. Here, the image processing section 244 may attempt to reduce delay by implementing conversion in partial image units. By using, as the partial image units at this time, partial image units that match partial image units that are decided on the basis of the scanning order or the splitting configuration of a display panel, it is possible to make a series of processing a pipeline process and realize further reduction of delay.

The display control section 246 includes the display controller 220 and the control section 218 depicted in FIG. 3, and causes partial image data for a display process to be displayed on display panels of the head-mounted display 100 and the flat panel display 302 sequentially. It should be noted that, because compressed/encoded data of partial images is acquired individually from the server 400 in the present embodiment, the acquisition order may change depending on the communication status or partial image data itself may not be able to be acquired due to packet loss, for example.

In view of this, the display control section 246 derives the time that has passed since rendering of each partial image, on the basis of the generation time of the partial image, and then adjusts timings of output of the partial images to a display panel such that rendering timings at the server 400 are reproduced. That is, on the basis of the generation time of partial image data and/or the time that has passed since the generation time, the display control section 246 identifies a data acquisition status such as the original order of display or display timings of partial image data or the amount of loss of partial image data.

Then, according to the data acquisition status, the display control section 246 changes subjects of output to a display panel and appropriately adjusts the output order and output timings, for example. For example, according to the data acquisition status, the display control section 246 decides whether to output the original partial image data included in a next frame or to output again partial image data included in a frame preceding the next frame. At this time, the display control section 246 decides such output subjects by the timing of a vertical synchronizing signal which is the display start time of the next frame.

For example, in a case where there are lost partial images in a frame at a rate which is equal to or greater than a predetermined value, the display control section 246 may change output subjects according to the amount (rate) of acquired partial images by replacing output subjects with data in a previous frame or making other changes. In addition, according to past records of output of past frames or the time that has passed from generation times, the display control section 246 may change output subjects in the next frame display period. Then, the display control section 246 outputs, to a display panel, partial image data decided as output subjects, at the decided order and timings.

The point-of-gaze acquiring section 248 acquires positional information of a point of gaze of a user on a moving image having been subjected to rendering displayed on a display apparatus, such as the head-mounted display 100 or the flat panel display 302, connected to the image processing apparatus 200. For example, a point-of-gaze detector is provided inside the head-mounted display 100, or a point-of-gaze detector is worn by a user looking at the flat panel display 302, to acquire results of measurement obtained by the point-of-gaze detectors.

Then, when the image data acquiring section 240 of the image processing apparatus 200 transmits information regarding the positional coordinates of points of gaze to the communication section 426 of the server 400 at a predetermined rate, the image generating section 420 and the compressing/encoding section 422 acquire it as necessary. For example, the point-of-gaze detectors may be typical apparatuses that irradiate the eyes of a user with reference beams such as infrared rays, and may identify a point of gaze on the basis of the directions of pupils obtained by detecting the reflection beams by using sensors.

Note that, in preparation for a failure of transmission from the image processing apparatus 200, the point-of-gaze acquiring section 248 may transmit, to the server 400, a predetermined number of history values along with the latest values of positional information of a point of gaze. In addition, in a case where a process using a point of gaze is not implemented at the server 400, the function of the point-of-gaze acquiring section 248 at the image processing apparatus 200 can be omitted.

Figure 7:
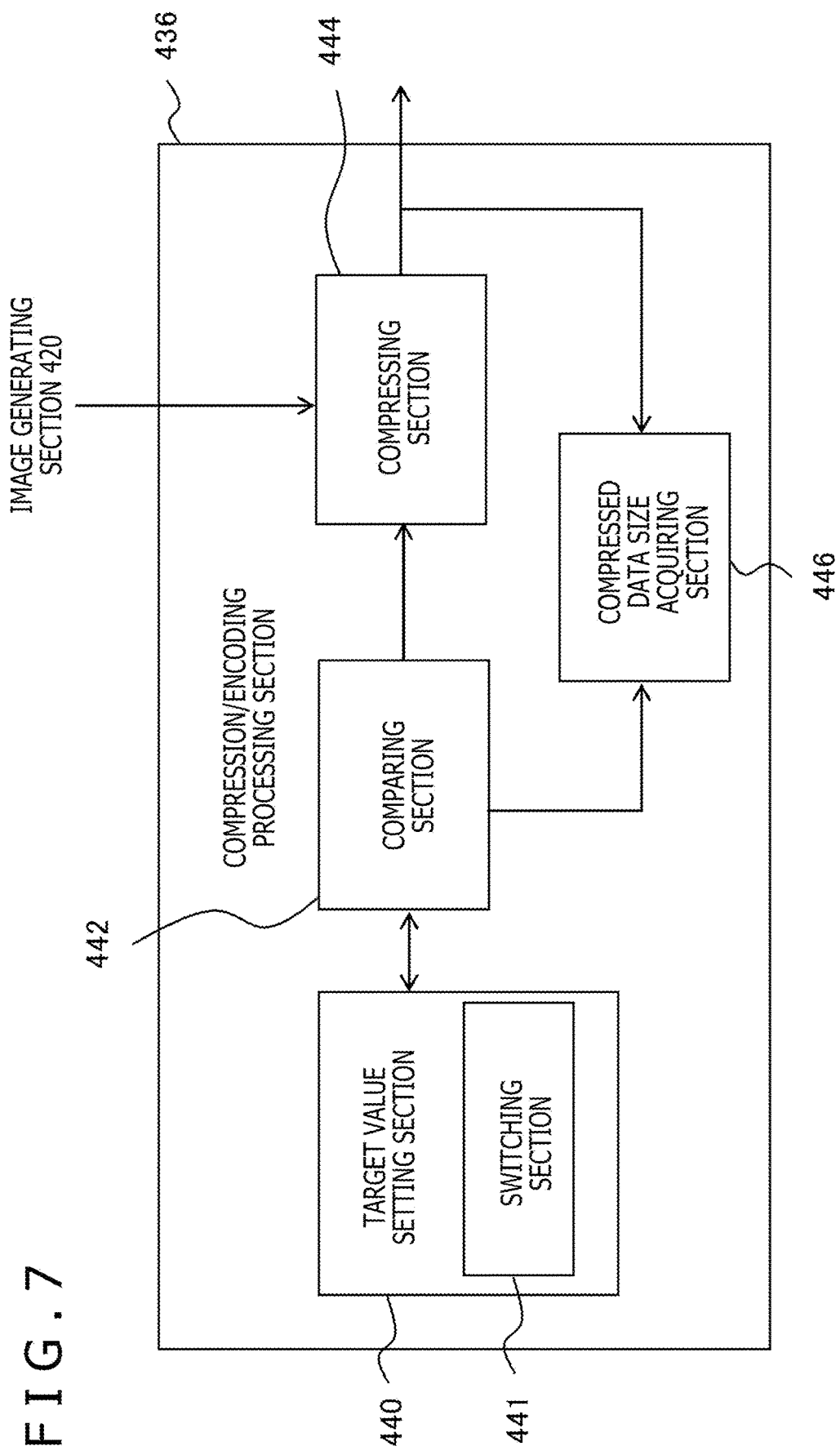
FIG. 7 is a figure depicting functional blocks of a compression/encoding processing section having a feedback control function in the present embodiment.

FIG. 7 depicts functional blocks of the compression/encoding processing section 436 having a feedback control function. The compression/encoding processing section 436 includes a target value setting section 440, a comparing section 442, a compressing section 444, and a compressed data size acquiring section 446. The target value setting section 440 sets a target value of a compressed data size of each compression unit and, consequently, a target change of the cumulative value of data sizes. Hereinafter, mainly the latter is called a "target value." Target values are basically decided such that a bit rate upper limit determined from an available transfer bandwidth or the like is reached in unit time.

Here, in normal control not using a rate control map, for example, a bit rate is evenly distributed to the number of compression units to be processed in unit time, and target values are thereby a directly proportional function of time. It should be noted that this does not mean normal control is limited to this. On the other hand, in a case where a rate control map is used, the target value setting section 440 sets target values according to image quality deterioration tolerances set on the map. That is, the target value setting section 440 makes it possible to keep the data size small by setting the rate of change of target values lower as image quality deterioration tolerances increase.

As described above, the compressing section 444 compresses and encodes image data generated by the image generating section 420. The compressed data size acquiring section 446 acquires the size of each compression unit of compressed and encoded data obtained as results of actual compression and encoding performed by the compressing section 444. The comparing section 442 compares a target value set by the target value setting section 440 and the cumulative value of data sizes obtained after actual compression and encoding, and adjusts quantization parameters on the basis of the difference therebetween.

That is, in a case where the cumulative data size obtained after compression is significantly smaller than the target value, the compressing section 444 is controlled such that the subsequent compression process is performed with smaller quantization parameters. In a case where the cumulative data size obtained after compression is significantly larger than the target value, the compressing section 444 is controlled such that the subsequent compression process is performed with larger quantization parameters. This process can actually use a typical control technique such as PID (Proportional Integral Differential) control. By such feedback control, the cumulative value of data sizes obtained after compression converges to the target value, and it is possible to make the size of data that should be transferred per unit time equal to or smaller than a bit rate upper limit.

Here, the target value setting section 440 includes a switching section 441. The switching section 441 acquires, from the comparing section 442, information related to the difference between a target value and an actual cumulative data size. Then, as described above, when the difference satisfies a predetermined condition under which the data size should be reduced significantly, the control is switched from normal control to control using a rate control map. That is, target values are switched from typical linear target values to target values reflecting image quality deterioration tolerances and representing position-dependent changes.

FIG. 8 depicts figures for explaining advantages of performing feedback control by use of a rate control map in the present embodiment. Both (a) and (b) in FIG. 8 represent changes of cumulative values of compressed and encoded data sizes in unit time T along the passage of time represented by the horizontal axes. For example, in the unit time T, compression units in a sliced partial image 12 on an image plane 10 like the one depicted in the upper section of FIG. 8 are compressed and encoded starting from the left end toward the right end.

A cumulative data size "A" represents a bandwidth (bit rate upper limit) that can be used for communication between the server 400 and the image processing apparatus 200 in the unit time T. (a) is a compression/encoding result according to normal feedback control. The example depicted in (a) is based on the premise that the data sizes of all the compression units are made uniform. As a result, target values 14 that are represented by a broken line change linearly over time. On the other hand, the actual data size varies depending on the contents of images. If it is attempted to make the data size converge to the target values 14 by feedback control, an overshoot 18 or an undershoot 20 occurs as in cumulative data sizes 16 represented by a solid line.

That is, compression units whose data sizes have fallen below the target values are likely to cause an overshoot due to feedback. Compression units whose data sizes have exceeded the target values are likely to cause an undershoot due to feedback. In addition, if the state of an overshoot lasts long for reasons such as that there are consecutive complicated images at an earlier stage of the unit time T, it becomes necessary to rapidly increase the compression rate at a later stage in order to satisfy a constraint condition of the cumulative data size in the unit time T that the cumulative data size should be equal to or smaller than the upper limit A. As a result, unintended changes of the image quality occur depending on positions on the image, and consequently, the image quality of important portions may lower undesirably.

(b) depicts a compression/encoding result in a case where feedback control is performed by using a rate control map in the present embodiment. For example, in a case where a rate control map on which image quality deterioration tolerances of a middle region are set low as in the region 8a or the region 8b in FIG. 5 is used and compression and encoding are performed starting from an end of the partial image 12 crossing the middle of the image plane 10, target values 22 of the cumulative data size represented by a broken line have a shape having a noticeable increase in a limited period at an intermediate portion of the unit time T.

In contrast, actual cumulative data sizes 24 represented by a solid line can have an overshoot or an undershoot as expected due to feedback control, but, even in such a case, they are changes that exhibit significant increases in a limited period at an intermediate portion of the unit time T. As a result, it becomes possible to allocate a larger data size to a middle region of the image plane than to other regions.

Figure 9:
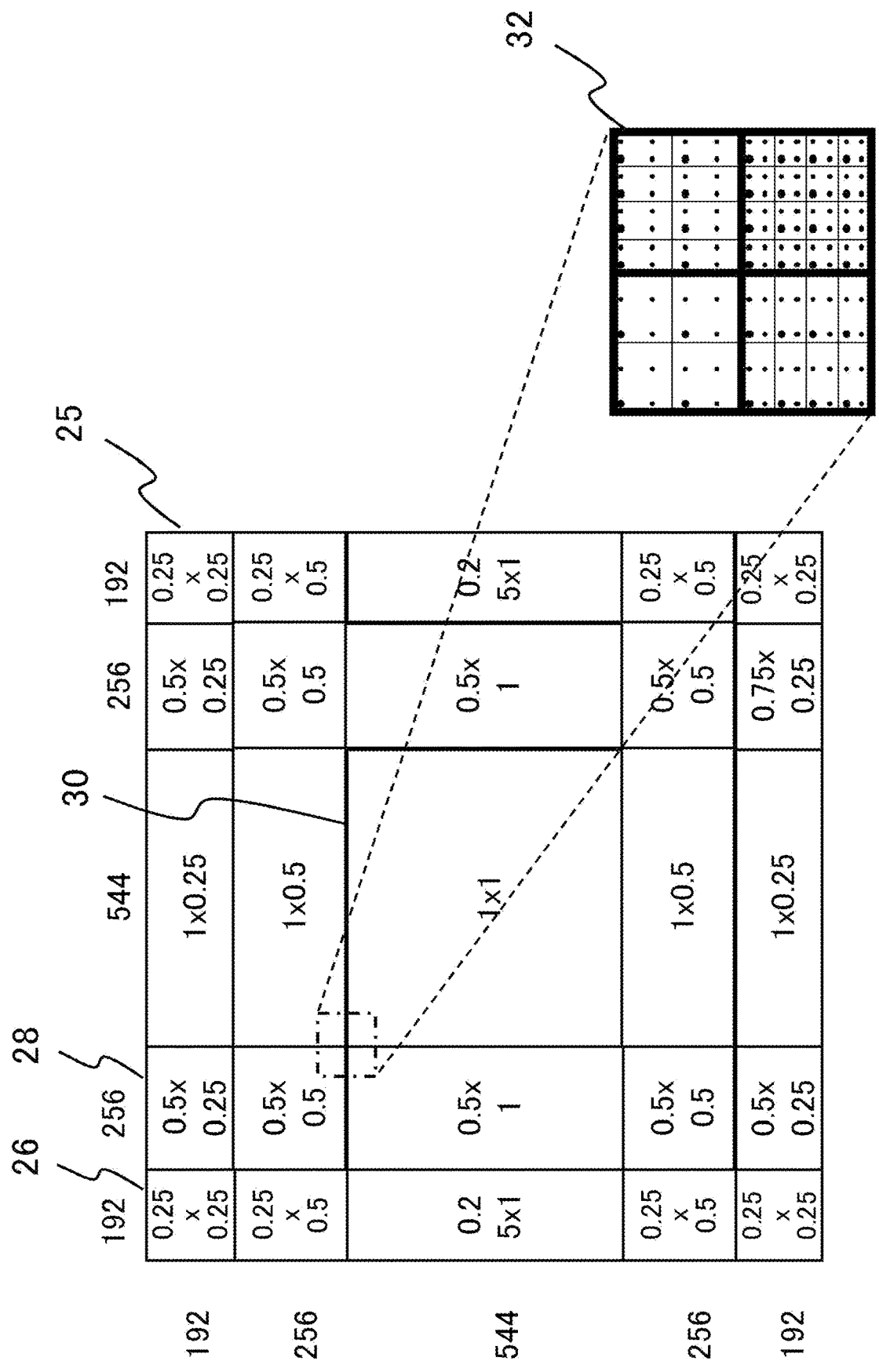
FIG. 9 is a figure for explaining processing contents, of an image generating section, that can be used for generation of a rate control map in the present embodiment.

FIG. 9 is a figure for explaining processing contents, of the image generating section 420, that can be used for generation of a rate control map. In a typical image rendering process, image data is generated by computing values representing colors of unit regions, as pixels, having the same area size formed by splitting an image plane evenly. On the other hand, data sizes may be reduced by making area sizes or aspect ratios of pixel regions different depending on positions on an image plane.

In the example depicted in FIG. 9, a region 25 including 1440×1440 pixels, for example, which is one of left-eye and right-eye images to be displayed on the head-mounted display 100 is depicted. 5×5=25 regions are formed by splitting this region into five in both the vertical and horizontal directions into widths of 192 pixels, 256 pixels, 544 pixels, 256 pixels, and 192 pixels. Then, the data size is reduced by lowering resolutions of some regions, that is, by reducing the sizes of images of the regions.

Numerical values written in 25 rectangular regions in the example depicted in FIG. 9 represent rates of size reduction in the lateral direction and the vertical direction. For example, a middle region 30 in which "1×1" is written is at the same scale in both the vertical and horizontal directions, that is, the size of the image is not reduced. The size of the image of an upper left region 26 in which "0.25×0.25" is written is reduced to ¼ in both the vertical and horizontal directions. The size of the image of a region 28 to the right of the region 26 in which "0.5×0.25" is written is reduced to ½ in the lateral direction and ¼ in the vertical direction.

Such a size reduction process can be understood as a process of changing the area size to be included in one pixel on an image plane on which actually the values of colors have been obtained evenly as depicted in a partially enlarged view 32. That is, for a "1×1" region, pixel values are decided in smallest units, and, for example, for a "0.5×0.5" region, pixel values are decided in area size units which are twice as large in both directions.

Figure 10:
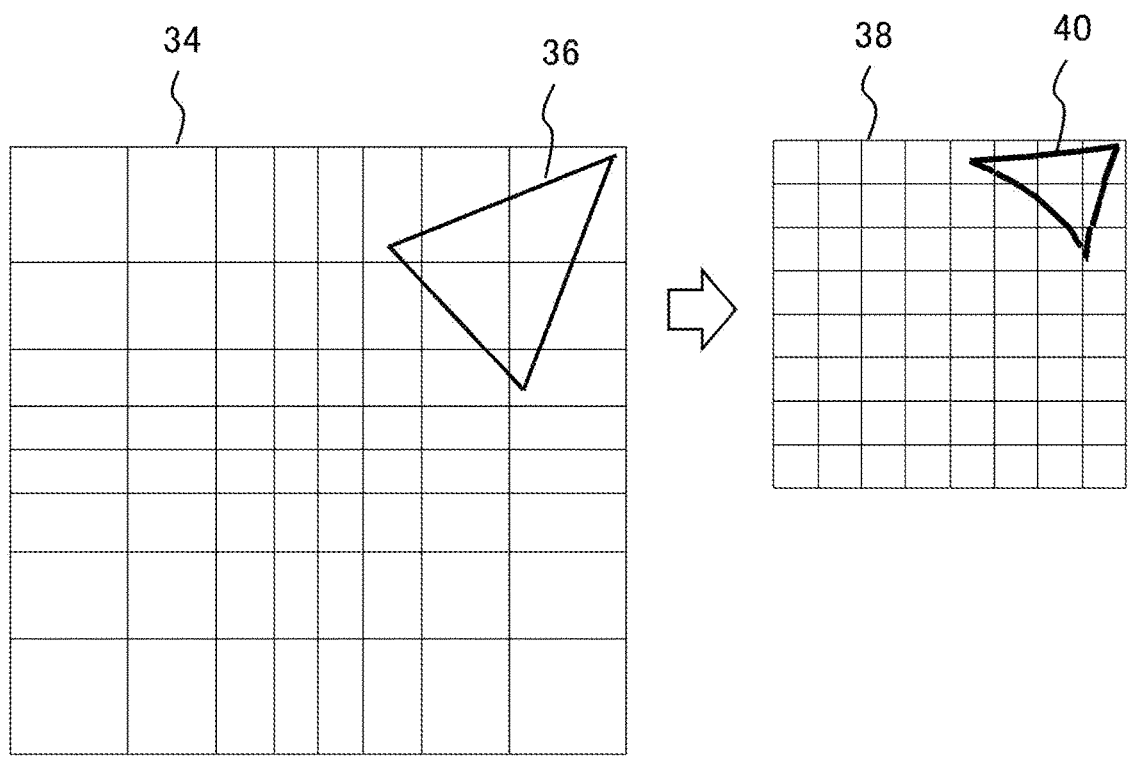
FIG. 10 is a figure conceptually depicting a change on an image caused by changing pixel area sizes in the present embodiment.

FIG. 10 conceptually depicts a change on an image caused by changing pixel area sizes. An image 34 is an image having the original size, and has pixels with area sizes which are different between regions that are formed by splitting the square shape as represented by lines. An image 38 is an image on data that is obtained in a case where the pixels with area sizes which are different between the regions are represented as having the same area sizes. An image 36 drawn on the original image is deformed as represented by an image 40, as a result of size reduction at rates which are different depending on positions.

For example, in a case where pixel area sizes are increased (the size reduction rates are increased) at positions closer to the periphery of the region as depicted in FIG. 9, the image 40 becomes an image which is distorted to have smaller sizes at positions closer to the periphery. The image generating section 420 (i.e. a GPU) retains therein a resolution map on which an image plane is split according to predetermined rules and size reduction rates (resolutions) are set as depicted in FIG. 9, splits a rendering-subject area on the basis of the resolution map, and performs rendering of different areas at different resolutions to thereby generate data like the image 38. As a result, the amount of computation, the memory access amount, and the processing time required for the rendering can be reduced.

Figure 11:
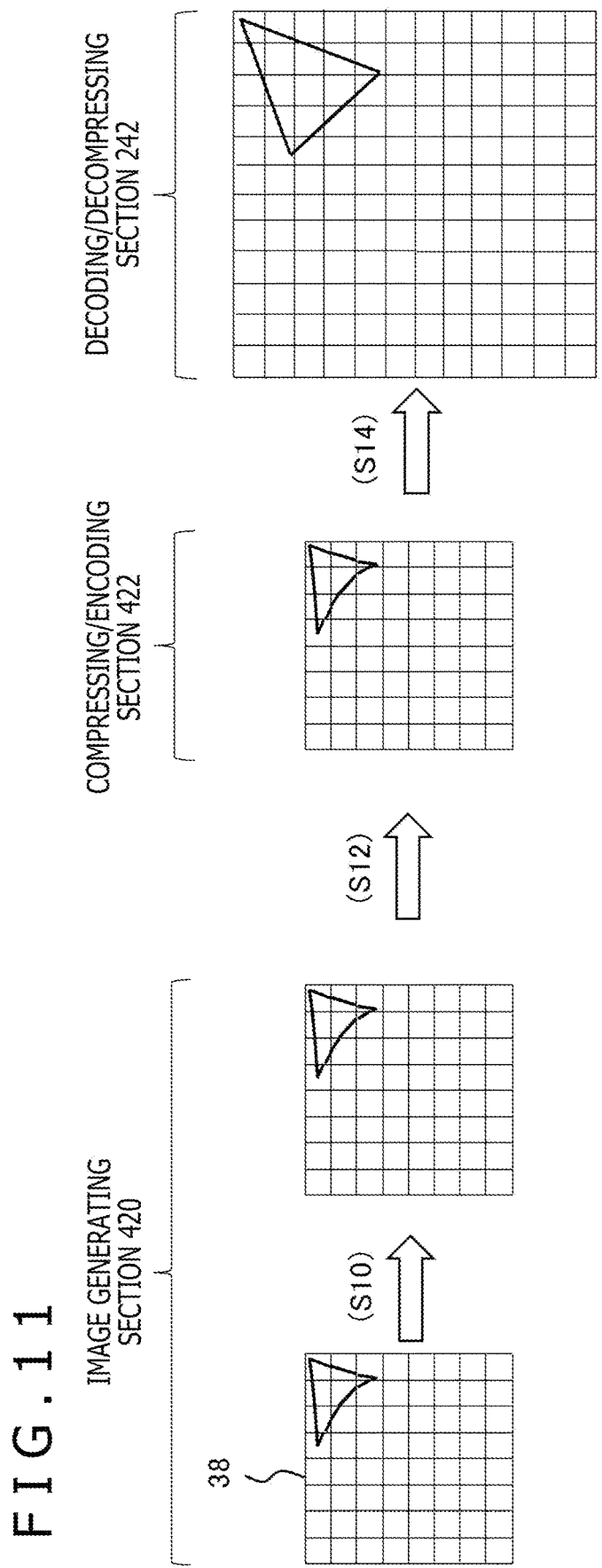
FIG. 11 is a figure illustrating a flow, until a display process, of data conversion of an image having different resolutions depending on areas in the present embodiment.

In a case where pixel area sizes are made different among areas in this manner, it is necessary to perform conversion into data with uniform resolutions in which the pixel area sizes are made uniform according to the pixel array of a display panel at any of stages until a display process. FIG. 11 illustrates a flow, until a display process, of data conversion of an image having different resolutions depending on areas. In this example, data like the image 38 in FIG. 10 generated by the image generating section 420 of the server 400 is compressed and encoded in that state, and is transferred to the image processing apparatus 200. That is, the image generating section 420 outputs the image 38 having the pixel count, the resolution, and the aspect ratios of pixel regions with no changes being made thereto (S10), and the compressing/encoding section 422 compresses and encodes the image 38 with no changes being made thereto (S12).

The server 400 transmits, to the image processing apparatus 200, the data compressed and encoded in such a manner and a resolution map. The image data acquiring section 240 of the image processing apparatus 200 acquires them, and the decoding/decompressing section 242 decodes and decompresses the data, and then performs interpolation of pixels on the basis of the resolution map to thereby generate data with the original pixel array, that is, data with uniform resolutions having the original pixel count, resolution, and aspect ratios of pixel regions (S14). Due to such a process, the number of pixels that should be transmitted from the server 400 to the image processing apparatus 200 can be reduced.

Figure 12:
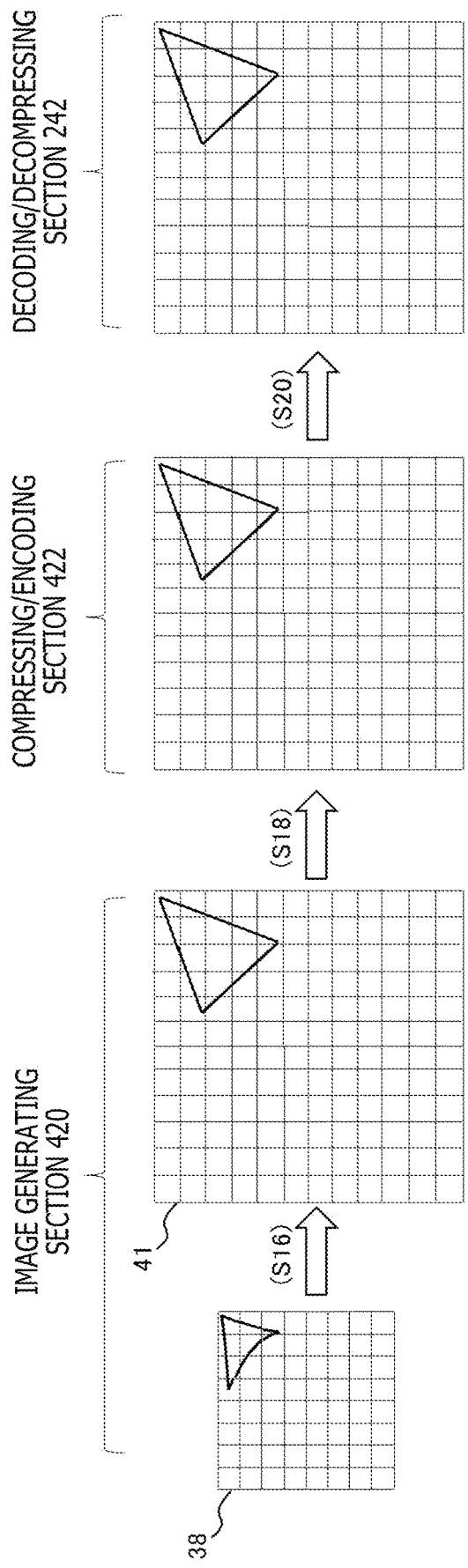
FIG. 12 is a figure depicting another example of the flow, until the display process, of the data conversion of the image having different resolutions depending on areas in the present embodiment.

FIG. 12 depicts another example of the flow, until the display process, of the data conversion of the image having different resolutions depending on areas. In this example, after generating data like the image 38 in FIG. 10, the image generating section 420 of the server 400 performs interpolation of pixels on the basis of a resolution map to thereby generate an image 41 with uniform resolutions having the original pixel array, that is, the original pixel count, resolution, and aspect ratios of pixel regions (S16). Then, the compressing/encoding section 422 compresses and encodes the image 41 (S18).

In this case, the decoding/decompressing section 242 of the image processing apparatus 200 can obtain an image with uniform resolutions simply by decoding and decompressing data transmitted from the server 400 (S20). The number of pixels that should be transmitted to the image processing apparatus 200 cannot be reduced according to this procedure, but by making a rate control map to be used by the compressing/encoding section 422 one that reflects a resolution map, compression and encoding at equivalent image quality are possible at a bit rate equivalent to the case depicted in FIG. 11. Depending on whether or not the decoding/decompressing section 242 of the image processing apparatus 200 supports data conversion based on a resolution map, the server 400 decides whether to adopt the process procedure in FIG. 11 or the process procedure in FIG. 12.

Note that a resolution map to be used may be fixed or may be dynamically generated by the image generating section 420 according to the contents of images. For example, the image generating section 420 may identify the sizes and positions of regions that are desired to be displayed specifically, by analyzing a moving image or performing other processes, and may set resolutions such that the resolutions of the regions are maintained but the resolutions of regions farther from those regions lower.

In a case where a fixed resolution map is used, a rate control map reflecting the resolution map may be generated in advance and stored on the rate control map storage section 430. In a case where a variable resolution map is used, every time the image generating section 420 generates a resolution map, the status acquiring section 432 of the compressing/encoding section 422 acquires the data, and the map generating section 434 makes a rate control map reflect the data. At this time, the map generating section 434 may correct the rate control map prepared in advance, by adding image quality deterioration tolerances computed from the resolution map to values on the rate control map or multiplying values on the rate control map by weighting values obtained from the resolution map, for example.

Alternatively, the map generating section 434 may newly generate a rate control map from a resolution map. In any case, in a case where a resolution map is reflected, derivation rules are prepared in advance such that as set resolutions lower (as size reduction rates increase), values of image quality deterioration tolerances on a rate control map increase. As a result, the compression rate of a portion where the image generating section 420 has maintained the resolution can be lowered, and the image quality can be kept even after the portion has been subjected to a compression/encoding process.

FIG. 13 depicts figures for explaining another example of the processing contents, of the image generating section 420, that can be used for generation of a rate control map. In this example, a distribution of resolutions, that is, a distribution of pixel area sizes, is decided on the basis of the contents of an actual image. In a case where rendering of an image depicted in (a) in FIG. 13 is performed, the image generating section 420 first generates a pixel map like the one depicted in (b) on the basis of at least any one of distances from the center of the field of view, the intensity of motions of objects, the levels of detail of images, and the like, and then computes pixel values according to it.

The pixel map depicted in (b) represents original pixel regions on the image plane as squares, and higher resolutions (smaller pixel regions) are represented by deeper colors as depicted in the legend below. For example, a region where a main object 42 is displayed is set as a region where a pixel value is to be computed for each "1×1" pixel unit, that is, for each original pixel. Regions which are on the left and right relative to the advancing direction in the image world and in which relatively important objects 44 are displayed are set as regions where a pixel value is computed for each set of "1×2" or "2×1" pixel units depending on an array.

The image generating section 420 analyzes a rendering-subject moving image, and generates a pixel map on the basis of the importance of objects, the sizes of images, the importance of presented contents, the elaborateness, colors, the intensity of motions, texture types, whether or not an object is a subject of operation by a user, and the like. Qualitatively, the higher the importance is or the higher the level of detail of an image is, the smaller the pixel units are. Other than generating a pixel map at the start of rendering of a moving image, the image generating section 420 updates the pixel map as appropriate for each partial image, for each frame, for each set of a predetermined number of frames, at a time of a switch of scenes, and the like.

In this case also, conversion into data with uniform resolutions in which pixel area sizes are made uniform is performed at any of stages by a procedure similar to the one depicted in FIG. 11 or FIG. 12. That is, in a case where the decoding/decompressing section 242 of the image processing apparatus 200 supports data conversion based on pixel maps, the server 400 compresses and encodes an image including different pixel units depending positions with no changes being made thereto, and transfers the image to the image processing apparatus 200. Then, by decoding and decompressing the data and then performing interpolation of pixels on the basis of a pixel map, the decoding/decompressing section 242 of the image processing apparatus 200 generates data with uniform resolutions having the original pixel count, resolution, and aspect ratios of pixel regions.

Due to such a process, the number of pixels that should be transmitted from the server 400 to the image processing apparatus 200 can be reduced. On the other hand, in a case where the decoding/decompressing section 242 does not support data conversion based on pixel maps, the image generating section 420 of the server 400 generates an image with uniform resolutions having the original pixel array, that is, the original pixel count, resolution, and aspect ratios of pixel regions by performing, on the basis of a pixel map, interpolation of pixels of an image including different pixel units depending on positions. Then, the decoding/decompressing section 242 of the image processing apparatus 200 acquires an image with uniform resolutions simply by decoding and decompressing data transmitted from the server 400.

The number of pixels that should be transmitted to the image processing apparatus 200 cannot be reduced according to this procedure, but by making a rate control map to be used by the compressing/encoding section 422 one that reflects a pixel map, compression and encoding at equivalent image quality are possible at a bit rate equivalent to a case where image data whose pixel count has been reduced is transferred. In this manner, in a case where the image generating section 420 performs rendering of an image by treating a plurality of pixels in each of some partial regions collectively as one pixel according to a pixel map, a rate control map to be used by the compressing/encoding section 422 can be one that reflects the pixel map.

That is, every time the image generating section 420 generates a pixel map, the status acquiring section 432 acquires the data, and the map generating section 434 makes a rate control map reflect the data. The manner of making the rate control map reflect the data may be similar to that in the case of a resolution map. As a result, the compression rate of a portion where the image generating section 420 has performed rendering at fine granularity can be lowered, and the image quality can be kept even after the portion has been subjected to a compression/encoding process. Note that the map generating section 434 may further generate or correct the rate control map, for example, taking into consideration a resolution map. As a result, image quality deterioration tolerances can be set for combinations of regions which are formed by splitting the resolution map and images which are formed by splitting the pixel map.

Figure 14:
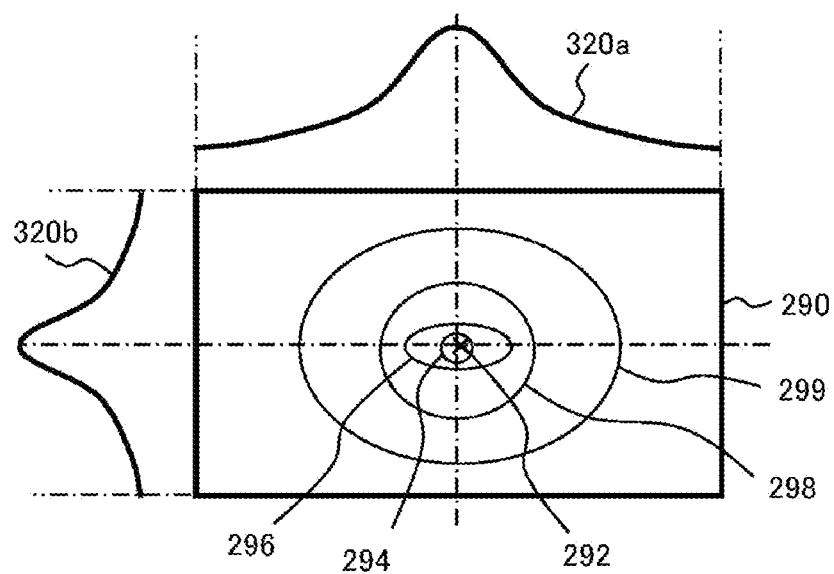
FIG. 14 is a figure for explaining principles of generating a rate control map on the basis of a point of gaze of a user in the present embodiment.

FIG. 14 is a figure for explaining principles of generating a rate control map on the basis of a point of gaze of a user. It is supposed, in the example depicted in FIG. 14, that a point of gaze 292 of a user on a display screen 290 of a display apparatus connected to the image processing apparatus 200 is located in a middle region. Because the face of a user wearing the head-mounted display 100 normally faces a direction in which the user wants to see, the middle of the display screen 290 can also be regarded as the point of gaze 292. It should be noted that the point of gaze 292 at any position can be detected by introducing a point-of-gaze detector.

According to typical human visual characteristics, a region 294 corresponding to a range of 5° from the central axis which coincides with a line of sight extending from a pupil to a point of gaze is called a discrimination field of view, and the visual function such as sight is high. In addition, a region 296 corresponding to a horizontal range of approximately 30° and a vertical range of approximately 20° is called an effective field of view, and information can be taken in instantaneously from this range by simple motions of an eye. Further, a region 298 corresponding to a horizontal range of 60° to 90° and a vertical range of 45° to 70° is called a stable field of fixation, a region 299 corresponding to a horizontal range of 100° to 200° and a vertical range of 85° to 130° is called a surrounding field, and, in this manner, the information discrimination ability lowers as distances from the point of gaze 292 increase.

That is, as depicted in the upper portion and left portion in FIG. 14, the discrimination is represented by functions 320a and 320b that give larger values as distances to the point of gaze 292 on the plane of the display screen 290 decrease. Note that, whereas the functions 320a and 320b are depicted relative to one-dimensional positions in the horizontal direction and the vertical direction on the plane of the display screen 290 in FIG. 14, they actually represent a distribution relative to two-dimensional positional coordinates on the plane. Because influence on visual impressions is smaller in regions where the discrimination of a user is lower even if the image quality is lowered in those regions, it is sufficient if image quality deterioration tolerances are qualitatively set such that the distribution, in terms of increase and decrease, of the image quality deterioration tolerances is opposite to the functions 320a and 320b.

In a case where the point-of-gaze acquiring section 248 is provided to the image processing apparatus 200, the status acquiring section 432 in the compressing/encoding section 422 of the server 400 serially acquires the positional coordinates of an actual point of gaze on a display screen. Then, the map generating section 434 causes the positional coordinates to be reflected on a rate control map. In this case also, the map generating section 434 may correct the rate control map prepared in advance by, for example, adding image quality deterioration tolerances dependent on distances from a point of gaze, or may newly generate a rate control map. In addition, a final rate control map may be generated by combining image quality deterioration tolerances obtained from another perspective described above.

In a case where the image generating section 420 performs rendering based on a point of gaze, the map generating section 434 may cause information regarding the rendering to be reflected on the rate control map, by referring to the information. As a technology for keeping the processing load of rendering or data sizes low or small by performing rendering at a high resolution for the center of a field of view where the discrimination ability of a user is high like a discrimination field of view described above and performing rendering at lower resolutions for fields of view farther from the center, foveated rendering is known (e.g. see "Foveated 3D graphics," Brian Guenter, et. al., ACM Transactions on Graphics, Vol. 31, No. 6, Article 164, November 2012).

In this case, on the basis of the positional coordinates of a point of gaze obtained from the point-of-gaze acquiring section 248 of the image processing apparatus 200, the image generating section 420 sets boundaries of resolutions on an image plane and resolution reduction rates. A map representing, on an image plane, a distribution of the resolutions thus decided is called a foveated rendering map. The status acquiring section 432 of the compressing/encoding section 422 acquires a foveated rendering map from the image generating section 420, and the map generating section 434 makes a rate control map reflect the foveated rendering map. The manner of making the rate control map reflect the foveated rendering map may be similar to the manner described above.

In this case also, conversion into data with uniform resolutions in which pixel area sizes are made uniform is performed at any of stages by a procedure similar to the one depicted in FIG. 11 or FIG. 12. That is, in a case where the decoding/decompressing section 242 of the image processing apparatus 200 supports data conversion based on a foveated rendering map, the server 400 compresses and encodes an image having been subjected to foveated rendering with no changes being made thereto, and transfers the image to the image processing apparatus 200. Then, by decoding and decompressing the data and then performing interpolation of pixels on the basis of a foveated rendering map, the decoding/decompressing section 242 of the image processing apparatus 200 generates data with uniform resolutions having the original pixel count, resolution, and aspect ratios of pixel regions.

Due to such a process, the number of pixels that should be transmitted from the server 400 to the image processing apparatus 200 can be reduced. On the other hand, in a case where the decoding/decompressing section 242 does not support data conversion based on a foveated rendering map, the image generating section 420 of the server 400 generates an image with uniform resolutions having the original pixel array, that is, the original pixel count, resolution, and aspect ratios of pixel regions by performing, on the basis of a pixel map, interpolation of pixels of an image having been subjected to foveated rendering.

Then, the decoding/decompressing section 242 of the image processing apparatus 200 acquires an image with uniform resolutions simply by decoding and decompressing data transmitted from the server 400. The number of pixels that should be transmitted to the image processing apparatus 200 cannot be reduced according to this procedure, but by making a rate control map to be used by the compressing/encoding section 422 one that reflects a foveated rendering map, compression and encoding at equivalent image quality are possible at a bit rate equivalent to a case where image data whose pixel count has been reduced is transferred.

Note that the image generating section 420 of the server 400 may implement any single one of switching of a resolution for each area, computation of pixel values for a set of a plurality of pixels, and foveated rendering that are described thus far, or may implement a combination of two or more of them. In a case where a combination is implemented, a process is performed similarly to manners described above, on the basis of a map created by combining a resolution map, a pixel map, and a foveated rendering map as appropriate.

Figure 15:
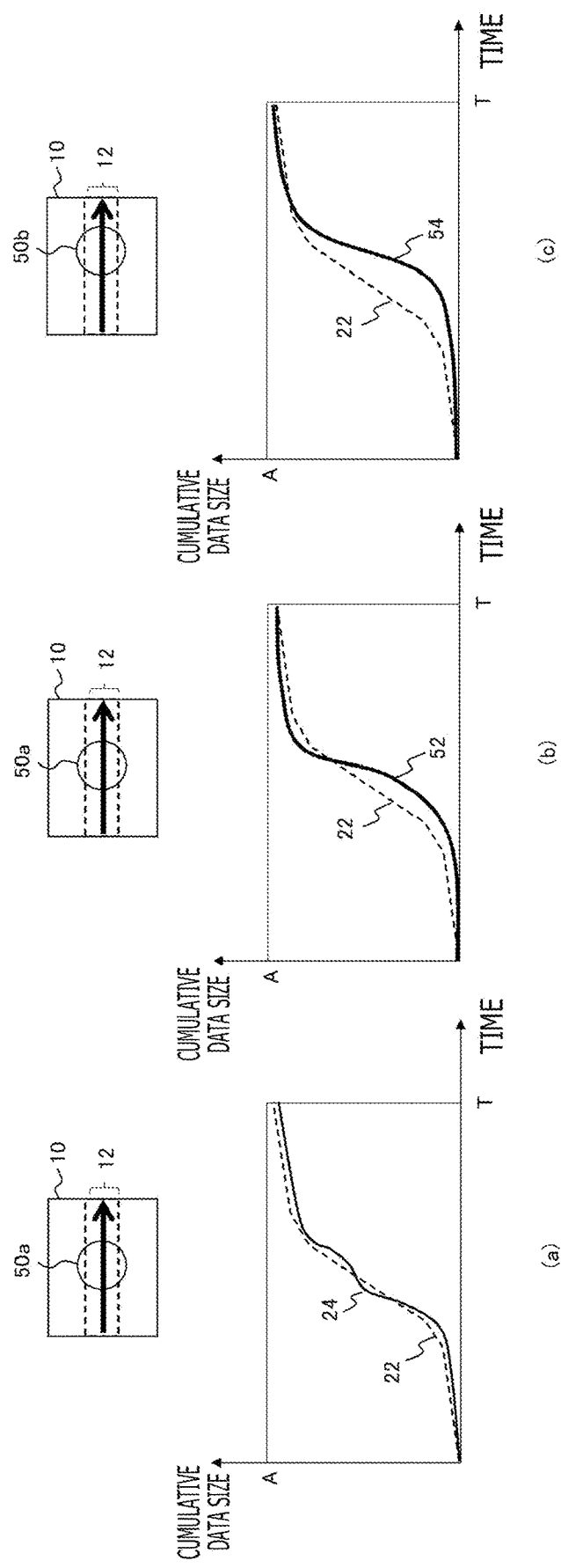
FIG. 15 depicts figure for explaining advantages obtained in a case where a rate control map is corrected on the basis of the contents of an image or a point of gaze of a user in the present embodiment.

FIG. 15 depicts figures for explaining advantages obtained in a case where a rate control map is corrected on the basis of the contents of an image or a point of gaze of a user. The manner of representation of the figure is similar to that of FIG. 8. Similarly to (b) in FIG. 8, (a) depicts the cumulative value of data sizes obtained at a time when the sliced partial image 12 is compressed and encoded sequentially from the left end by using a rate control map on which image quality deterioration tolerances of the middle region 50a of the image plane 10 are set low. That is, as a result of performing feedback control using target values 22 based on the rate control map, actual cumulative data sizes 24 are obtained as in the figure.

(b) and (c) depict the cumulative values of data sizes obtained at a time when compression and encoding are implemented by using a rate control map corrected on the basis of the contents of an image and a point of gaze of a user as described above. It should be noted that the target values 22 which are the same as those in (a) are depicted for comparison. (b) depicts a case which is the same as the one described above in that the middle region 50a of the image plane 10 is an important portion, but, in this case, it has been found that the importance of the middle region 50a is higher, taking into consideration the contents of the image and a point of gaze. At this time, the map generating section 434 performs correction for further lowering the image quality deterioration tolerances of the middle region 50a on a rate control map.

Hence, data sizes allocated to other regions can be made relatively small. As a result, as depicted in (b), increase amounts of cumulative data sizes 52 are small at an earlier stage and a later stage of the unit time T, and increase suddenly in an intermediate limited period. (c) depicts a case where, for example, an important object or a point of gaze of a user is located at a position 50b which is to the right of the middle of the image plane 10.

At this time, the map generating section 434 corrects a rate control map such that a region where the image quality deterioration tolerance is low is moved to the right on the image plane. As a result, as depicted in (c), cumulative data sizes 54 increase suddenly after an intermediate portion of the unit time. In any case, a larger data size can easily be allocated to an important region while the cumulative value per unit time T of data sizes are kept equal to or smaller than the upper limit A.

Note that, as described above, the map generating section 434 may estimate a data size for each compression unit by causing the compression/encoding processing section 436 to actually compress and encode an image as a tentative compression process, and may correct a rate control map on the basis of a result of the estimated data size. In this case, the compression/encoding processing section 436 may speed up estimations of data sizes by performing simplified compression and encoding by a technique like the one described next. That is, the compression/encoding processing section 436 may perform a tentative compression process after lowering the resolution of an image generated by the image generating section 420.

At this time, the compression/encoding processing section 436 may prepare a plurality of images with reduced sizes created by lowering the resolution of an image generated by the image generating section 420 at ratios of 1/2, 1/4, and 1/8, and may perform a tentative compression process sequentially starting from the one with the lowest resolution. The lower the resolution of an image is, the higher the speed of an estimation of the data size by tentative compression is. The compression/encoding processing section 436 may repeat data size estimations sequentially starting from the ones with lower resolutions, and may stop the tentative compression process if the difference between a data size estimated at a certain resolution and a data size estimated at the previous resolution is equal to or smaller than a predetermined threshold value.

Alternatively, the compression/encoding processing section 436 may treat a rectangular region partially cut out from each compression unit as a sample region, and may perform a tentative compression process of the sample region without lowering the resolution. In this case, it is possible to prevent lowering of the precision of data size estimations due to loss of features such as definition or high-frequency components, the loss being caused by lowering resolutions. Here, the compression/encoding processing section 436 may increase the number of samples for a region whose image quality deterioration tolerance on a rate control map is equal to or lower than a predetermined value, that is, a compression unit determined as being important from a perspective of the contents of an image or a point of gaze of a user.

As a result, data size estimations can be performed accurately for portions where the compression rates are kept low and that are likely to have greater influence on a data size. In addition, the compression/encoding processing section 436 may omit a tentative compression process for regions, on a rate control map, where the image quality deterioration tolerances are equal to or higher than a predetermined value. The map generating section 434 refers to the thus-obtained estimate of a data size of each compression unit, and corrects a rate control map.

For example, it is supposed that it is found as a result of an estimation that, while there is a region where emphasis is desired to be placed on the image quality in the middle region 50a of the image plane 10, there is an image whose data size is difficult to be reduced even if compression is performed, at the position 50b which is to the right of the middle region 50a. In this case, the map generating section 434 relatively increases the image quality deterioration tolerances of regions other than them on a rate control map. A state similar to (b) and (c) in FIG. 15 is thereby created. As a result, as described above, similarly, a larger data size can be allocated to a region which needs it, while the cumulative value per unit time T of data sizes are kept equal to or smaller than the upper limit A. Note that correction of a rate control map by a tentative compression process can also be combined with correction performed from another perspective described above.

Temporal changes of the cumulative data sizes depicted in FIG. 8 and FIG. 15 are depicted on the premise that compression and encoding are proceeded with transversely from the right end to the left end of a sliced partial image that is formed by splitting an image plane in the horizontal direction. On the other hand, by compressing and encoding, earlier in the unit time T, a region to which a larger data size is desired to be allocated, the region may be excluded from subjects of passive adjustments of data sizes at a later stage of the unit time T. As a result, it is possible to more surely and stably allocate data sizes to regions where maintenance of the image quality is prioritized.

Figure 16:
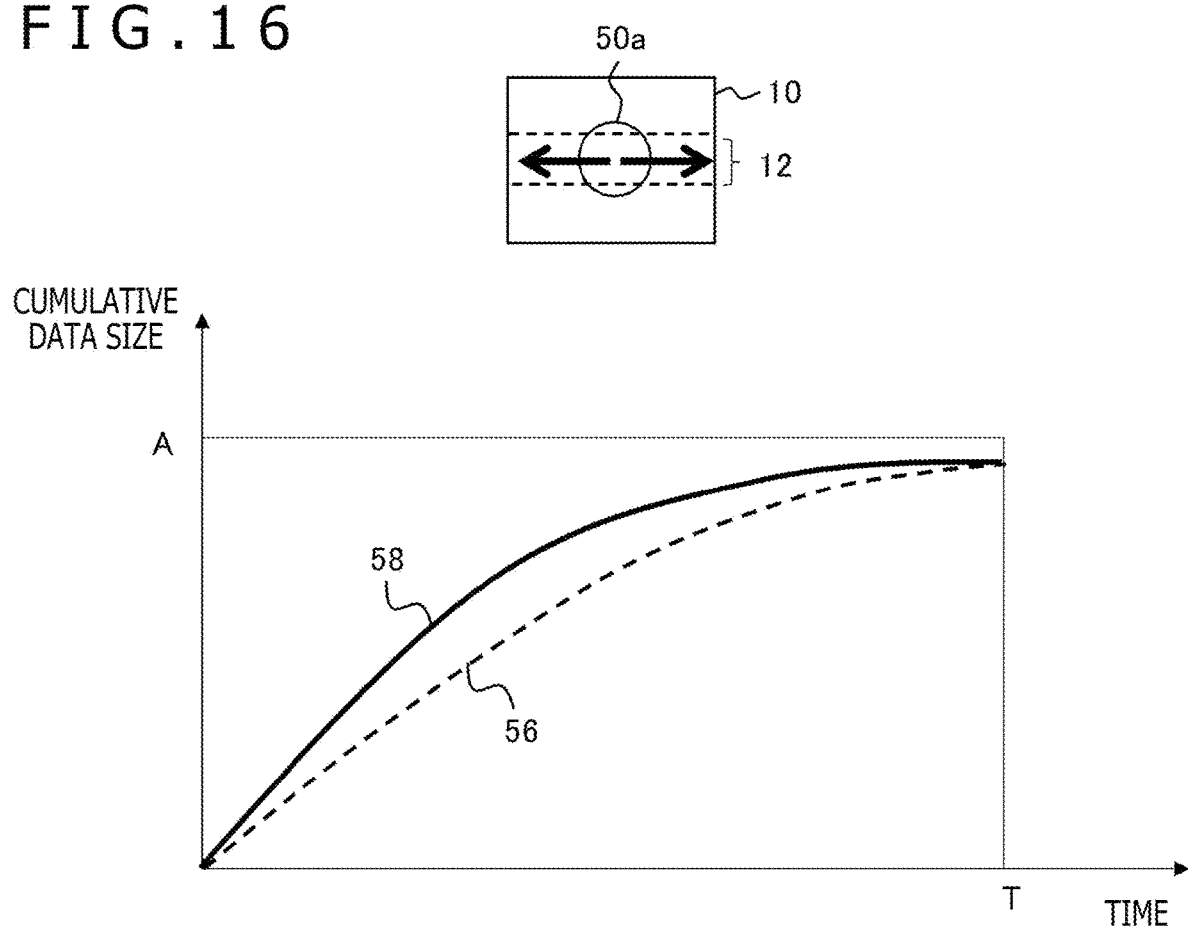
FIG. 16 is a figure illustrating changes of cumulative data sizes in a case where the processing order of compression and encoding in a partial image is made variable in the present embodiment.

FIG. 16 illustrates changes of cumulative data sizes in a case where the processing order of compression and encoding in a partial image is made variable. The manner of representation of the figure is similar to those of FIGS. 8 and 15. For example, in a case where the image quality deterioration tolerances of the middle region 50a of the image plane 10 are set low, the compression/encoding processing section 436 proceeds with compression and encoding in the left-right directions starting from the middle region 50a as represented by arrows in the upper section of FIG. 16. In this case, even if a rate control map which is the same as ones described thus far is used, target values 56 represented by a broken line exhibit a shape with change amounts that are large from an earlier stage of the unit time T and decrease gradually.

By performing feedback control of the target values, actual cumulative data sizes 58 represented by a solid line also exhibit similar changes. As a result, an abundant data size can be allocated to the middle region 50*a* where emphasis is placed on the image quality. In addition, even if control is performed to increase compression rates when the cumulative data size almost exceeds the bit rate upper limit A at a later stage of the unit time T, the visual influence can be reduced because processing subjects at that time are regions where emphasis is not placed on the image quality.

The compression/encoding processing section 436 buffers compression units for which compression and encoding have been ended and an amount of which corresponds to no more than one partial image, rearranges them in an order on the original image, and then outputs them as partial image data to the packetizing section 424. Alternatively, the server 400 may transmit partial image data keeping the order of the data at a time of compression and encoding, and the data may be rearranged in the original order on the side of the image processing apparatus 200. In this case, the server 400 transmits, along with the partial image data, a processing order map representing a compression processing order and, consequently, a transmission order, of compression units of each partial image.

Then, the decoding/decompressing section 242 of the image processing apparatus 200 decodes and decompresses the compression units in order of transmission from the server 400, then buffers compression units an amount of which corresponds to no more than one partial image, and thereby rearranges them in order on the original image. In any case, by completing the rearrangement of the processing order of compression and encoding in a partial image, a display process with short delay can be realized without inhibiting a pipeline process in partial image units described above. Note that, whereas the middle region 50*a* of the image plane 10 is treated as an important region and compression and encoding are proceeded with starting from the middle region 50*a* and in the left-right directions in FIG. 16, the start point of the compression/encoding process and directions in which the compression/encoding process is proceeded with are not particularly limited to any point and direction.

In any case, the basic principle is that the priority in processing order is increased in a partial image for compression units whose image quality deterioration tolerances represented by a rate control map are low, and it is sufficient if a compression processing order is decided further taking into consideration process efficiency and the like. As described above, in this aspect, control parameters may be temporally changed such that constraints of feedback control are relaxed at an earlier stage of the unit time T and constrains are made stricter toward a later stage. For example, in a case where PID control is performed, the P parameter (proportional component) and the D parameter (derivative component) are increased over time.

As a result, it is possible to avoid a state where a large overshoot or undershoot occurs in a region which is processed at an earlier stage and in which emphasis is placed on the image quality and where the image quality fluctuates between compression units as a result of variations of quantization parameters. Note that, in this case, control parameters may be changed consecutively over time, or control parameters may be changed inconsecutively by splitting the unit time T into a plurality of periods like an earlier stage, an intermediate stage, and a later stage and setting control parameters for each period.

FIG. 17 schematically depicts an example of setting the order of a compression/encoding process in a partial image in a case where the processing order is made variable. It is supposed in this example that the head-mounted display 100 is a display destination and a frame including left-eye and right-eye images is compressed and encoded. That is, on a processing order map 60, compression units are formed by splitting the plane of one frame including a left-eye region 62*a* and a right-eye region 62*b* into 11 in the vertical direction and into 6 in the lateral direction, and the order of a compression/encoding process on the compression units is represented by numbers. It is supposed here that compression units arrayed in one horizontal column form a partial image.

In addition, regions 64*a* and 64*b* surrounded by dotted lines represent visible regions of a user on the head-mounted display 100, and unit regions not included in them are excluded from subjects of the compression process. As a result, the compression/encoding processing section 436 skips the compression process of the uppermost first partial image, and implements the compression process only on compression units that are included in the second partial image below the first partial image and are given numbers, in order represented by the numbers. Upon completion of compression and encoding of eight compression units in the second partial image, the compression/encoding processing section 436 rearranges the order of the data back in the order of the buffered original data, and then outputs the data to the packetizing section 424.

The same applies also to the third partial image, the fourth partial image, and the fifth partial image below, the third partial image, the fourth partial image, and the fifth partial image are output in partial image units after compression and encoding performed in orders represented by the numbers. Then, the compression process of the lowermost sixth partial image is skipped. As a result, data sizes can be allocated stably without modifying the configuration of a pipeline process for each partial image, and also without using regions where emphasis is placed on the image quality, for passive adjustments of the cumulative data size.

Note that, in a case where an image including, in one frame, a plurality of highly similar images like a depicted image for a head-mounted display is to be compressed and encoded, it is desirable that the order of a compression process be set such that predictive encoding using the similarity can be performed efficiently in compression units. In the example depicted in FIG. 16, next to a unit region of "1" that is compressed and encoded first in the left-eye region 62*a*, a unit region of "2" at a position corresponding to the right-eye region 62*b* is compressed and encoded.

As a result, data of the unit region of "2" can be configured by a difference image using, as a reference image, the unit region of "1" highly similar to it, and the data size can be kept significantly small. Here, by using, as a reference image, a region compressed and encoded immediately before, a compression process for the difference image can be performed efficiently. In any case, the compression/encoding processing section 436 refers to a rate control map, creates the processing order map 60 by giving high ranks of priority to compression units with low image quality deterioration tolerances for each partial image and also taking into consideration a perspective such as the similarity between images, the efficiency of processing order, or the like, and then implements compression and encoding.

Note that the decision of order of a compression process based on image quality deterioration tolerances can be combined as appropriate with generation or correction of a rate control map from various perspectives described above. That is, it is sufficient if the compression/encoding processing section 436 refers to a final rate control map obtained from various perspectives and generates the processing order map 60.

According to the present embodiment described thus far, in a process of compressing and encoding moving image data, a rate control map representing image quality deterioration tolerances is referred to, and control is performed to prioritize increases of compression rates of regions with higher tolerances. Here, the rate control map is set such that the image quality deterioration tolerances are low for a portion which is likely to be visually recognized by a user, a portion which is important in terms of the contents of an image, a portion including an actual point of gaze, a portion estimated as a result of a tentative compression process, as a portion whose data size is unlikely to be reduced, and the like.

As a result, while prioritizing allocation of large data sizes to those portions and maintaining the image quality of the portions, it is possible to keep the cumulative data size per unit time equal to or smaller than a predetermined value. Control of data sizes by use of a rate control map is implemented when a predetermined condition under which data sizes should be reduced significantly is satisfied in normal control not referring to the rate control map. Hence, it is possible to prevent the image quality from lowering wastefully due to excessive data compression, and also to reduce influence on the load of the compression/encoding process.

In addition, by performing a pipeline process on data obtained after compression and encoding, in units of partial images formed by splitting one frame, delay time until a display process can be reduced. At this time, by proceeding with compression and encoding starting from a region which is in a partial image and where the image quality should be prioritized, data sizes can be allocated stably to important regions while the cumulative data size per unit time is kept equal to or smaller than a bit rate upper limit. Further, by temporally changing parameters of feedback control, the stability of allocation of data sizes can be enhanced further.

Second Embodiment

Figure 18:
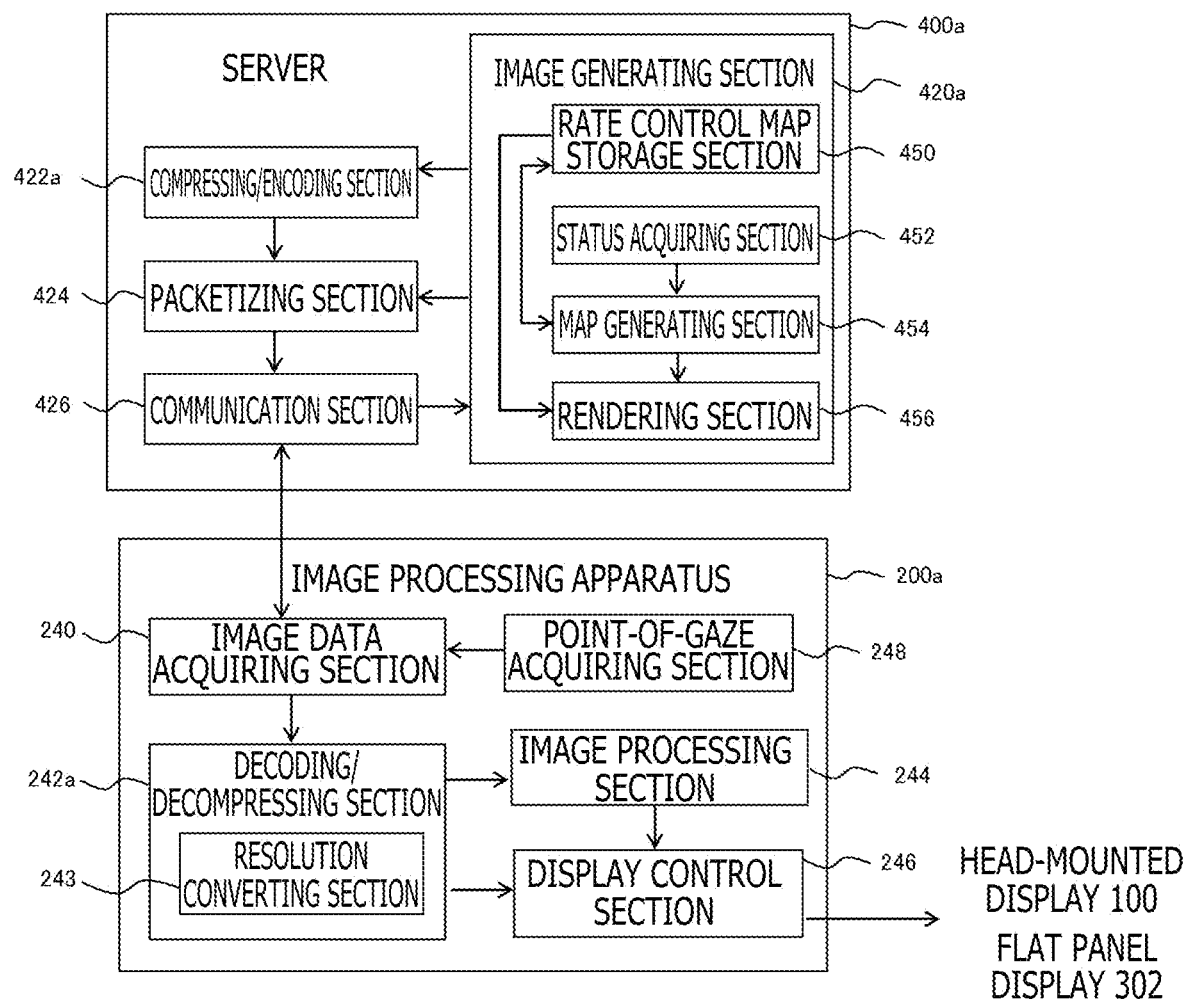
FIG. 18 is a figure depicting another example of functional blocks of a server and an image processing apparatus according to the present embodiment.

In the first embodiment, both image quality and data size reduction are pursued by the server 400 by compression and encoding of frame data according to a distribution based on a rate control map. On the other hand, the size of data that should be transmitted can be reduced while influence on the quality of an image to be visually recognized is suppressed, only by transmitting data whose resolution on an image plane has been changed, without performing control of such a compression/encoding process. FIG. 18 depicts functional blocks of a server 400a and an image processing apparatus 200a according to the present embodiment. Note that the basic configuration of these apparatuses and the configuration of an image display system including them are similar to those in the first embodiment. In addition, blocks that are in FIG. 18 and have functions similar to those of their counterparts in FIG. 6 are given the same reference signs, and explanations thereof are omitted as appropriate.

The server 400 includes an image generating section 420a, the compressing/encoding section 422, the packetizing section 424, and the communication section 426. Here, the image generating section 420a performs rendering of a moving image while changing resolutions depending on positions on a frame plane of the image. Specifically, the image generating section 420a includes a resolution map storage section 450, a status acquiring section 452, a map generating section 454, and a rendering section 456. The resolution map storage section 450 stores a resolution map, like the one depicted in FIG. 9, representing a distribution of resolutions on the plane of a frame. The status acquiring section 452 acquires information related to various statuses that can have influence on a distribution of resolutions. For example, the status acquiring section 452 acquires information that is to be used when foveated rendering is implemented and that is related to the position of a point of gaze of a user.

Alternatively, the status acquiring section 452 identifies ends of a field of view, regions where motions of objects are small, regions where the elaborateness is low, and the like by analyzing a rendering-subject image, for example. On the basis of the information acquired by the status acquiring section 452, the map generating section 454 generates a map representing a distribution of resolutions on the plane of a frame. For example, the map generating section 454 generates a foveated rendering map like one on which resolutions are lower at portions farther from a point of gaze of a user. Alternatively, on the basis of ends of a field of view, regions where motions of objects are small, regions where the elaborateness is low, and the like, the map generating section 454 generates a pixel map, like the one depicted in FIG. 13, representing, on the plane of a frame, a set of pixels for which a computation of one pixel value is to be performed.

On the basis of at least any one of a resolution map stored on the resolution map storage section 450, a foveated rendering map generated by the map generating section 454, and a pixel map generated by the map generating section 454, the rendering section 456 performs rendering of an image while changing resolutions depending on positions on a frame plane. Note that the maps are collectively referred to as "resolution maps" in the following explanation. In a case where rendering of an image is performed by using only a static resolution map stored on the resolution map storage section 450, the functions of the status acquiring section 452 and the map generating section 454 can be omitted. In addition, the map generating section 454 may generate a final resolution map by reading out a static resolution map stored on the resolution map storage section 450 and correcting the static resolution map such that it reflects resolutions decided from another perspective and a distribution of sets of pixels.

A compressing/encoding section 422a compresses and encodes image data generated by the image generating section 420. Here, as described above, the compression rate control function, of the compressing/encoding section 422 according to the first embodiment, based on a rate control map can be omitted. Functions of the packetizing section 424 and the communication section 426 are similar to those in the first embodiment. It should be noted that the packetizing section 424 associates a resolution map adopted by the image generating section 420a for image rendering with data of a frame. The communication section 426 sequentially transmits the data to the image processing apparatus 200a in units of partial images.

The image processing apparatus 200a includes the image data acquiring section 240, a decoding/decompressing section 242a, the image processing section 244, the display control section 246, and the point-of-gaze acquiring section 248. A function of the image data acquiring section 240 is similar to that in the first embodiment. It should be noted that the image data acquiring section 240 acquires, from the server 400, a resolution map along with compressed and encoded partial image data. Similarly to the first embodiment, the decoding/decompressing section 242a decodes and decompresses compressed and encoded partial image data. It should be noted that, in the present embodiment, the decoding/decompressing section 242a includes a resolution converting section 243. The resolution converting section 243 restores the original pixel array by performing interpolation of pixels by using a resolution map transmitted from the server 400, for example, and performs conversion into an image with uniform resolutions.

As a result, as illustrated in FIG. 11, by decoding and decompressing transmitted data that has been compressed and encoded while resolutions on an image plane is kept changed and then performing interpolation of pixels on the basis of a resolution map, the decoding/decompressing section 242a generates data with uniform resolutions having the original pixel count, resolution, and aspect ratios of pixel regions. Functions of the image processing section 244, the display control section 246, and the point-of-gaze acquiring section 248 may be similar to those in the first embodiment.

According to the present embodiment described thus far, the server changes resolutions depending on positions on a frame plane of a moving image, performs rendering of an image, and then stream-transfers the image along with a resolution map representing a distribution of the resolutions. The image processing apparatus, which is on the client-side, converts the image into an image in the original state where resolutions of the frame are uniform, on the basis of the resolution map, and then outputs the image on a display panel. At this time, the server maintains the resolutions of rendering and, consequently, the image quality, of the middle of the image where a user is likely to gaze at, an actual point of gaze, portions which are more noticeable due to the contents of the image, and the like. As a result, the number of pixels and, consequently, the size of data, that should be transmitted from the server to the image processing apparatus can be reduced with less influence on the visually-recognizable image quality.

The present invention has been explained thus far on the basis of embodiments thereof. The embodiments illustrate examples, and it should be understood by those skilled in the art that various modification examples are possible in terms of combinations of constituent elements and processing processes of the embodiments, and also such modification examples lie within the scope of the present invention.

INDUSTRIAL APPLICABILITY

As described above, the present invention can be used for various types of information processing apparatuses such as a server, an image display apparatus, a head-mounted display, a game apparatus, a mobile terminal, or a personal computer, an image display system including any of them, and the like.

REFERENCE SIGNS LIST

1: Image display system
100: Head-mounted display
200: Image processing apparatus
240: Image data acquiring section
242: Decoding/decompressing section
244: Image processing section
246: Display control section
248: Point-of-gaze acquiring section
302: Flat panel display
400: Server
420: Image generating section
422: Compressing/encoding section
424: Packetizing section
426: Communication section
430: Rate control map storage section
432: Status acquiring section
434: Map generating section
436: Compression/encoding processing section
440: Target value setting section
441: Switching section
442: Comparing section
444: Compressing section
446: Compressed data size acquiring section
452: Status acquiring section
454: Map generating section
456: Rendering section

The invention claimed is:

1. An image data transfer apparatus comprising:
processing circuitry configured to:
perform rendering of a to-be-displayed moving image;
for each of a plurality of compression units on a plane of a frame included in the moving image, refer to a rate control map on which an image quality deterioration tolerance is set for each compression unit and set a target value for a cumulative data size after compression and encoding corresponding to the image quality deterioration tolerance;
determine an order based upon the image quality deterioration tolerance;
compress and encode data of the moving image in the order while adjusting a compression rate based upon the cumulative data size and the target value; and
stream-transfer the compressed and encoded data of the moving image.

2. The image data transfer apparatus according to claim 1, wherein the processing circuitry is configured to set the target value by referring to the rate control map depending on whether or not a predetermined condition is satisfied.

3. The image data transfer apparatus according to claim 1, wherein the processing circuitry is configured to store the rate control map that has been generated in advance.

4. The image data transfer apparatus according to claim 1, wherein the processing circuitry is configured to:
perform rendering of images at different resolutions on the plane of the frame, and
change the image quality deterioration tolerances on a basis of a distribution of the resolutions of the images.

5. The image data transfer apparatus according to claim 1, wherein the processing circuitry is configured to:
perform rendering of an image according to a resolution map on which an image size reduction rate is set for each region formed by splitting the plane of the frame, and
change the image quality deterioration tolerances on a basis of the resolution map.

6. The image data transfer apparatus according to claim 1, wherein the processing circuitry is configured to:
provide a region where a pixel value is computed for a set of a plurality of pixels according to contents of an image, and change the image quality deterioration tolerances on a basis of a pixel map representing the set of the pixels on the plane of the frame.

7. The image data transfer apparatus according to claim 4, wherein the processing circuitry is configured to use different resolutions according to distances from a point of gaze of a user on the moving image on the plane of the frame.

8. The image data transfer apparatus according to claim 1, wherein the processing circuitry is configured to change the image quality deterioration tolerances according to distances from a point of gaze of a user on the moving image on the plane of the frame.

9. The image data transfer apparatus according to claim 3, wherein the processing circuitry is configured to store, in association with a head-mounted display that is a display destination of the moving image, the rate control map generated on a basis of an optical parameter of an eye piece included in the head-mounted display.

10. The image data transfer apparatus according to claim 1, wherein the processing circuitry is configured to:
tentatively compress and encode data of the frame, and
correct the rate control map on a basis of an estimated value of a data size for each compression unit obtained as a result of the tentative compression/encoding.

11. The image data transfer apparatus according to claim 10, wherein the processing circuitry is configured to acquire the estimated value by performing tentative compression and encoding after making the frame a low resolution frame.

12. The image data transfer apparatus according to claim 10, wherein the processing circuitry is configured to acquire the estimated value by performing tentative compression and encoding using a partial region in each compression unit as a sample region.

13. The image data transfer apparatus according to claim 12, wherein the processing circuitry is configured to use different numbers of sample regions in different compression units on a basis of the rate control map.

14. The image data transfer apparatus according to claim 1, wherein the processing circuitry is configured to transfer data obtained after compression and encoding for each partial image that is formed by splitting the plane of the frame according to a predetermined rule and that includes the plurality of compression units.

15. The image data transfer apparatus according to claim 14, wherein the processing circuitry is configured to transfer data of the partial image formed by rearranging, in an order of original image, the compression units compressed and encoded in a different compression/encoding order.

16. The image data transfer apparatus according to claim 14, wherein the processing circuitry is configured to:
perform feedback control of a data size of the compressed and encoded data by using the target value, and
temporally change a control parameter in the compression and encoding of the partial image.

17. The image data transfer apparatus according to claim 14, wherein the processing circuitry is configured to;
compress and encode one of a left-eye image and a right-eye image included in one frame as a difference image relative to the other as a reference image, and
consecutively compress and encode compression units that are at positions corresponding to the left-eye image and the right-eye image.

18. An image display system comprising:
an image data transfer apparatus including processing circuitry configured to:
perform rendering of a to-be-displayed moving image, including rendering of images at different resolutions on a plane of a frame included in the moving image,
for each of a plurality of compression units on the plane of the frame included in the moving image, refer to a rate control map on which an image quality deterioration tolerance is set for each compression unit and set a target value for a cumulative data size after compression and encoding corresponding to the image quality deterioration tolerance,
determine an order based upon the image quality deterioration tolerance,
compress and encode data of the moving image in the order while adjusting a compression rate based upon the cumulative data size and the target value,
stream-transfer the compressed and encoded data of the moving image, and
change the image quality deterioration tolerances on a basis of a distribution of the resolutions of the images; and
an image processing apparatus including processing circuitry configured to:
acquire data of the moving image stream-transferred by the image data transfer apparatus,
cause the moving image to be displayed,
acquire a map representing a distribution of the resolutions on the plane of the frame adopted for rendering of the frame,
acquire data of the frame,
decode and decompress the data of the frame,
convert the data of the frame into data with uniform resolutions on a basis of the map.

19. An image display system comprising:
an image data transfer apparatus including processing circuitry configured to:
perform rendering of a to-be-displayed moving image,
provide a region where a pixel value is computed for a set of a plurality of pixels,
for each of a plurality of compression units on a plane of a frame included in the moving image, refer to a rate control map on which an image quality deterioration tolerance is set for each compression unit and set a target value for a cumulative data size after compression and encoding corresponding to the image quality deterioration tolerance,
determine an order based upon the image quality deterioration tolerance,
compress and encode data of the moving image in the order while adjusting a compression rate based upon the cumulative data size and the target value,
stream-transfer the compressed and encoded data of the moving image, and
change the image quality deterioration tolerances on a basis of a pixel map representing the set of the pixels on the plane of the frame; and
an image processing apparatus including processing circuitry configured to:
acquire data of the moving image stream-transferred by the image data transfer apparatus,
cause the moving image to be displayed,
acquire the pixel map adopted for rendering of the frame,
acquire data of the frame,
decode and decompress the data of the frame, and convert the data of the frame into data with uniform resolutions on a basis of the pixel map.

20. An image display system comprising:
an image data transfer apparatus including processing circuitry configured to:
perform rendering of a to-be-displayed moving image,
for each partial image that is formed by splitting a plane of a frame included in the moving image and that includes a plurality of compression units, refer to a rate control map on which an image quality deterioration tolerance is set for each compression unit and set a target value for a cumulative data size after compression and encoding corresponding to the image quality deterioration tolerance,
determine an order based upon the image quality deterioration tolerance,
compress and encode data of the moving image in the order while adjusting a compression rate based upon the cumulative data size and the target value,
stream-transfer the compressed and encoded data of the moving image; and
an image processing apparatus including processing circuitry configured to:
acquire data of the moving image stream-transferred by the image data transfer apparatus,
cause the moving image to be displayed,
acquire a processing order map, adopted by the processing circuitry of the image data transfer apparatus, representing a compression/encoding order of compression units,
acquire data of the partial image, and
decode and decompress the data of the partial image in compression units, and
arrange the data of the partial image in an order on an original image.

21. An image data transfer method performed by an image data transfer apparatus, the image data transfer method comprising:
performing rendering of a to-be-displayed moving image;
for each of a plurality of compression units on a plane of a frame included in the moving image, referring to a rate control map on which an image quality deterioration tolerance is set for each compression unit and setting a target value for a cumulative data size after compression and encoding corresponding to the image quality deterioration tolerance;
determine an order based upon the image quality deterioration tolerance;
compressing and encoding data of the moving image in the order while adjusting a compression rate based upon the cumulative data size and the target value; and
stream-transferring the compressed and encoded data of the moving image.

22. A non-transitory computer readable medium storing a computer program for a computer which, when executed by the computer, causes the computer to perform a method, the method comprising:
performing rendering of a to-be-displayed moving image;
for each of a plurality of compression units on a plane of a frame included in the moving image, referring to a rate control map on which an image quality deterioration tolerance is set for each compression unit and setting a target value for a cumulative data size after compression and encoding corresponding to the image quality deterioration tolerance;
determine an order based upon the image quality deterioration tolerance;
compressing and encoding data of the moving image in the order while adjusting a compression rate based upon the cumulative data size and the target value; and
stream-transferring the compressed and encoded data of the moving image.

\* \* \* \* \*